United States Patent [19]
Reynolds

[11] 3,924,721
[45] Dec. 9, 1975

[54] DIGITAL LOGIC AND SERVO SYSTEM FOR PRINT HEAD ROTATE CONTROL

[75] Inventor: Robert J. Reynolds, Ann Arbor, Mich.

[73] Assignee: Burroughs Corporation, Detroit, Mich.

[22] Filed: Oct. 11, 1974

[21] Appl. No.: 514,133

[52] U.S. Cl. .................................... 197/18; 318/685
[51] Int. Cl.$^2$ .............................................. B41J 7/34
[58] Field of Search ................... 197/18, 48, 49, 55; 318/685, 600, 18

[56] References Cited

UNITED STATES PATENTS

| | | | |
|---|---|---|---|
| 3,465,217 | 2/1965 | Kress | 318/18 |
| 3,789,971 | 2/1974 | Deyesso et al. | 197/18 |

OTHER PUBLICATIONS

IBM Technical Disclosure Bulletin, Vol. 12, No. 12, May 1970, p. 2245.

*Primary Examiner*—Paul E. Shapiro
*Attorney, Agent, or Firm*—Leon E. Redman; Edwin W. Uren

[57] ABSTRACT

A digital logic and servo system for controlling a servo motor which rotates a single element print head to a new print position by conforming the servo motor to an optimized velocity profile in accordance with a digital comparison between a rotate position error code and a derived velocity code. The rotate position error code and a weighted velocity code are derived from the output of a resolver that provides position information to the digital logic which causes the rotate motor to rotate the print head in the direction of the new print position in conformity with the optimized velocity profile. Digital logic is included that changes the weighting of the derived velocity code as it is input to the position error versus velocity comparator at a point in a print cycle when damping may be reduced without the risk of overshooting the new print position.

10 Claims, 23 Drawing Figures

FIG. 6A.

ROM TABLE ONE.

| | ADDRESS | | | | OUTPUT | |
|---|---|---|---|---|---|---|
| | D | C | B | A | Y2 | Y1 |
| 0. | 0 | 0 | 0 | 0 | 0 | 1 |
| 1. | 0 | 0 | 0 | 1 | 1 | 0 |
| 2. | 0 | 0 | 1 | 0 | 1 | 1 |
| 3. | 0 | 0 | 1 | 1 | 1 | 1 |
| 4. | 0 | 1 | 0 | 0 | 0 | 0 |
| 5. | 0 | 1 | 0 | 1 | 0 | 0 |
| 6. | 0 | 1 | 1 | 0 | 0 | 1 |
| 7. | 0 | 1 | 1 | 1 | 1 | 0 |
| 8. | 1 | 0 | 0 | 0 | 0 | 0 |
| 9. | 1 | 0 | 0 | 1 | 0 | 1 |
| 10. | 1 | 0 | 1 | 0 | 1 | 0 |
| 11. | 1 | 0 | 1 | 1 | 1 | 0 |
| 12. | 1 | 1 | 0 | 0 | 1 | 1 |
| 13. | 1 | 1 | 0 | 1 | 1 | 1 |
| 14. | 1 | 1 | 1 | 0 | 0 | 0 |
| 15. | 1 | 1 | 1 | 1 | 0 | 1 |

FIG. 6B.

ROM TABLE TWO.

| | ADDRESS | | | | OUTPUT | | | | | | | |
|---|---|---|---|---|---|---|---|---|---|---|---|---|
| | D | C | B | A | Y8 | Y7 | Y6 | Y5 | Y4 | Y3 | Y2 | Y1 |
| 0. | 0 | 0 | 0 | 0 | 1 | 0 | 0 | 0 | 1 | 0 | 0 | 1 |
| 1. | 0 | 0 | 0 | 1 | 1 | 0 | 0 | 1 | 0 | 1 | 1 | 0 |
| 2. | 0 | 0 | 1 | 0 | 1 | 0 | 1 | 0 | 0 | 0 | 1 | 1 |
| 3. | 0 | 0 | 1 | 1 | 1 | 0 | 1 | 1 | 0 | 0 | 0 | 0 |
| 4. | 0 | 1 | 0 | 0 | 1 | 0 | 1 | 1 | 1 | 1 | 1 | 0 |
| 5. | 0 | 1 | 0 | 1 | 1 | 1 | 0 | 0 | 1 | 0 | 1 | 1 |
| 6. | 0 | 1 | 1 | 0 | 1 | 1 | 0 | 1 | 1 | 0 | 0 | 0 |
| 7. | 0 | 1 | 1 | 1 | 1 | 1 | 1 | 0 | 0 | 1 | 0 | 1 |
| 8. | 1 | 0 | 0 | 0 | 0 | 0 | 1 | 0 | 0 | 0 | 0 | 0 |
| 9. | 1 | 0 | 0 | 1 | 0 | 0 | 1 | 0 | 1 | 1 | 0 | 1 |
| 10. | 1 | 0 | 1 | 0 | 0 | 0 | 1 | 1 | 1 | 0 | 1 | 0 |
| 11. | 1 | 0 | 1 | 1 | 0 | 1 | 0 | 0 | 0 | 1 | 1 | 1 |
| 12. | 1 | 1 | 0 | 0 | 0 | 1 | 0 | 1 | 0 | 1 | 0 | 0 |
| 13. | 1 | 1 | 0 | 1 | 0 | 1 | 1 | 0 | 0 | 0 | 0 | 1 |
| 14. | 1 | 1 | 1 | 0 | 0 | 1 | 1 | 0 | 1 | 1 | 1 | 1 |
| 15. | 1 | 1 | 1 | 1 | 0 | 1 | 1 | 1 | 1 | 1 | 0 | 0 |

FIG. 7.

PRINT HEAD CHARACTER COLUMN CODES.

| $R_n$ DR | 7 | 6 | 5 | 4 | 3 | 2 | 1 | 0 | 15 | 14 | 13 | 12 | 11 | 10 | 9 | 8 |
|---|---|---|---|---|---|---|---|---|---|---|---|---|---|---|---|---|
| $THETA_n$ | 105 | 158 | 211 | 263 | 316 | 368 | 421 | 474 | 526 | 579 | 632 | 684 | 737 | 789 | 842 | 895 |
| $DRP_n$ | 918 | 865 | 812 | 760 | 707 | 655 | 602 | 549 | 497 | 444 | 391 | 339 | 286 | 234 | 181 | 128 |
| PRINT HEAD CHARACTER COLUMNS | # | " | ! | ~ | 3 | 2 | 1 | 0 | C | B | A | @ | S | R | Q | P |
| | . | 8 | % | $ | 7 | 6 | 5 | 4 | G | F | E | D | W | V | U | T |
| | + | * | ) | ( | ; | : | 9 | 8 | K | J | I | H | [ | Z | Y | X |
| | , | . | — | , | ? | > | = | < | 0 | N | M | L | _ | ∧ | ] | \ |

DIGITAL LOGIC AND SERVO SYSTEM FOR PRINT HEAD ROTATE CONTROL

BACKGROUND OF THE INVENTION

The present invention relates generally to motor control systems, and, more particularly, to a novel control system for rotatably positioning a serial printer single element print head.

In a serial printer, a multiple character single element print head is tilted and rotated for positioning a desired character to a suitable position for impact printing against a print medium. The single element print head surface is provided with a plurality of columns of print characters with each column having a number of unique characters. To position the single element print head at a desired character, the print head must be rotated to a particular character column while being simultaneously tilted to the desired character in that column. Printing of the desired character is then accomplished by impacting the print head against the print medium at the positioned character. The present invention relates to the rotational positioning of the single element print head. The rotational control system of the subject invention may be employed in cooperation with a tilt control system such as that described in U.S. application Ser. No. 485,006 filed on July 1, 1974 by V. J. Quiogue, C. Elder and J. L. Worst, entitled "Logic System For Print Ball Tilt Control," and of common ownership herewith.

Prior art attempts at controlling the rotational positioning of a print head have relied primarily on analog techniques in which an analog comparison is made between an analog feedback signal from a tachometer to a D.C. reference voltage representative of a predetermined discrete velocity level. The tachometer and requisite analog comparators are fairly expensive components, thereby significantly increasing the cost of serial printer manufacture. Such analog servo systems require intricate factory adjustments that further increase the overall cost of manufacture. Furthermore, as the analog components in such servo systems become worn, their accuracy is impaired. These analog servo systems have a history of requiring costly maintenance in the field.

Servo control systems have been suggested in which digital logic is employed to choose among high, medium or low discrete velocity levels depending on the number of character columns remaining to be traversed as the print head is rotated to its new print position. However, ultimate velocity error detection depends on an analog comparison with a velocity feedback signal from a tachometer. Besides the already mentioned disadvantages of such an analog control system, and the added cost of providing a tachometer, an additional servo control loop must be provided in order to finally position the servo motor as final velocity is approached in order to avoid overshoot and oscillations about the new print position. While selecting an appropriate high, medium or low velocity level in response to the number of character columns remaining to be traversed may provide sufficient control to prevent overshoot in a relatively slow printer which further requires an additional fine positioning servo loop; it does not provide sufficient control to prevent overshoot in a high speed serial printer employing a more optimized velocity profile.

Overshoot is undesirable in a system for rotating a print head to a desired character column for a number of reasons. The principal reason is that it is almost impossible to control print head overshoot to a predictable level even with expensive and complicated circuitry, because no control is provided for mechanisms beyond the servo motor. Then, if oscillations occur at the desired print character column that cannot be controlled, an erroneous or smudged character is printed when the print head is impacted with the print medium. Furthermore, even if such print head oscillations could be controlled to a predictable level, it would be necessary for the system to allow sufficient time for such oscillations to settle out thereby considerably slowing the operation of the printer.

Most serial printers employing a print ball type single element print head have mechanical limits provided at the two extreme rotate positions. These mechanical limits are necessary in order to prevent damage to the various mechanical components linking the rotate motor output shaft with the print head and to protect the print head itself. These mechanical limits at the extreme rotate positions also prevent the print head from being rotated beyond 360°. This is especially important in the present rotate control system in order that the resolver is simply aligned with a reference rotate position, it will thereafter provide an accurate representation of the rotate position. However, if the print head were to be rotated beyond 360°, this reference would be lost and the resolver's output would no longer correspond to the actual rotate position. Therefore, by not permitting the print head to overshoot its destined rotate position, especially at the extreme rotate positions, the mechanical limits are protected and rotational reference is insured.

SUMMARY OF THE INVENTION

Accordingly, it is a primary object of the present invention to more precisely control the velocity of a servo motor rotatably positioning a print head and to increase the speed of a serial printer wherein a rotational control system conforms the servo motor to an optimized velocity profile.

An additional object of this invention is to sufficiently damp a servo motor to prevent any overshoot or oscillation about the final position to which it is being rotated and yet with such precision that the final position may be more rapidly attained.

It is a further object of this invention to provide a servo control system for rotating a single element print head to a desired character column in a minimum amount of time while insuring against overshoot and oscillations about the desired print position.

It is a yet further object of this invention to more precisely control the rotational velocity of a servo motor while at the same time completely obviating the use of a tachometer.

It is a still further object of this invention to provide a lower cost, higher speed, and more reliable serial printer.

An even further object of this invention is to provide a single loop servo system for controlling the rotation of a single element print head with a minimum number of analog components.

A still further object of this invention is to provide a print head positional control system relying primarily on digital rather than analog comparisons.

These and other objects are achieved in the digital logic and servo motor control system of the present invention which provides a position detector for determining the servo motor's present rotational position and from which a digital present rotate position code is generated for use both in calculating a rotate position error code and in deriving a weighted rotate velocity code which are compared for determining which of two alternate directions the servo motor drive current should be directed to optimize its velocity profile. Digital logic means is further provided for selectively changing the weighting of the derived velocity code to reduce damping on a servo motor in order that it may arrive at the desired rotate position in a reduced time.

Various other objects, advantages and meritorious features of the present invention will become more fully appreciated when considered with the following detailed description, appended claims, and the accompanying drawing.

BRIEF DESCRIPTION OF THE DRAWING

FIGS. 6A and 6B set forth in table format the complete contents of the ROMs comprising the code converter of FIG. 5;

FIG. 7 is a spread-out view of the print head character columns, which may be provided on the surface of a single element print head, along with the decimal equivalent of the binary input, present position, and destined position codes associated with each print head character column;

DETAILED DESCRIPTION

Figures 1, 2:
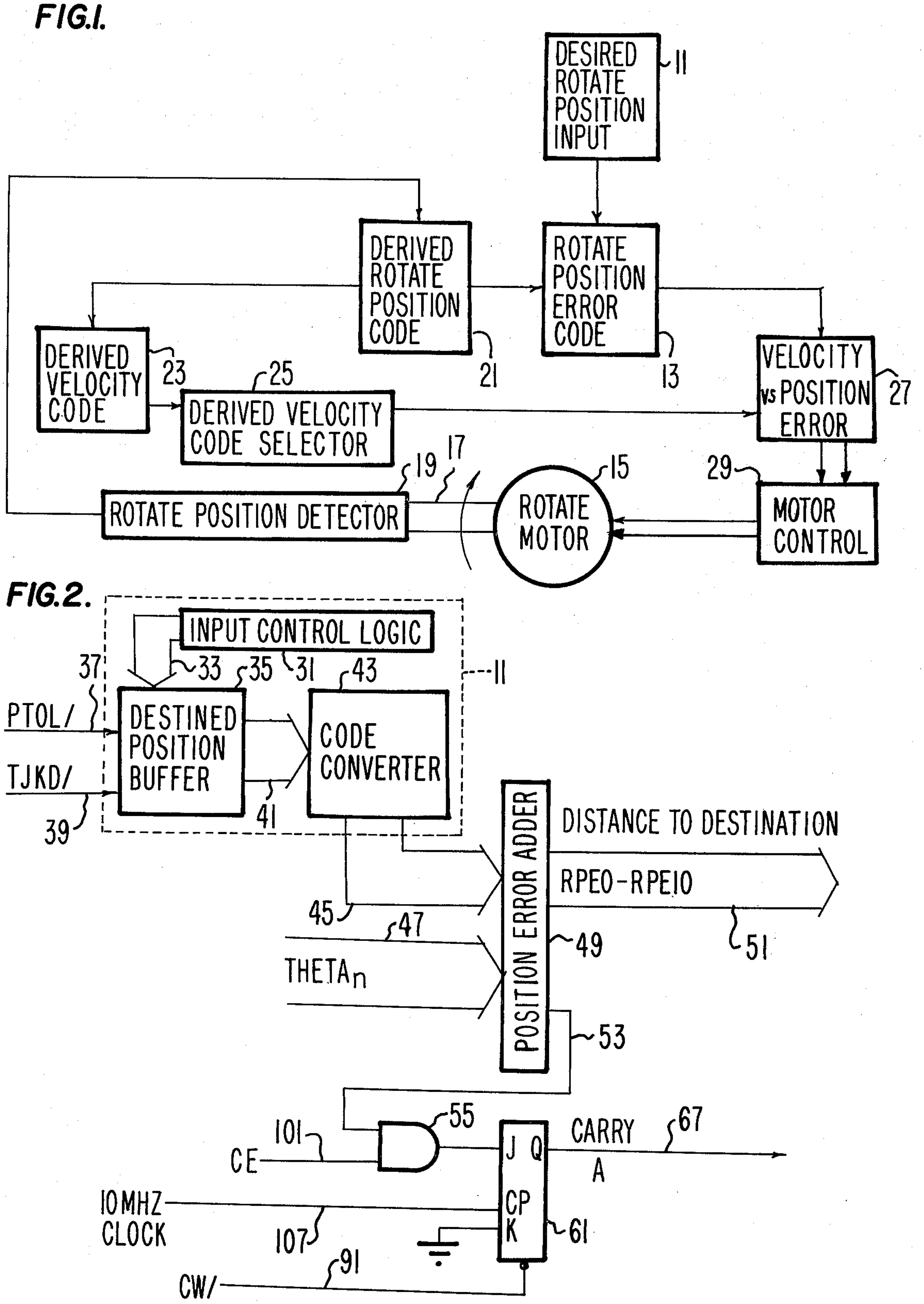
FIG. 1 is an overall block diagram of the digital logic and servo system for rotational control of a servo motor in the present invention.
FIG. 2 is a logic diagram of the desired rotate position input logic and rotate position error code logic of FIG. 1.

Referring now to FIG. 1, a digital logic and servo system is provided for precisely controlling the velocity profile and direction of rotation of a rotate motor 15 such that its output shaft 17 may be rotated from its present position to a desired position in a minimum amount of time while yet preventing any overshoot or oscillation once the destined position is reached. Precise velocity profile control is maintained by cyclically controlling the direction of drive current to the rotate motor.

The desired rotate position input logic block 11 provides a code, representative of the desired position to which the rotate motor is to be rotated. This desired rotate position code is provided as an input to the rotate position error code logic block 13. The desired rotation position input code corresponds to a predetermined character column from which a particular character provided on a print head within that column may be printed.

A rotate position detector 19 measures the rotate position of the output shaft 17 of the rotate motor 15. The measured rotate position is inputted to a derived rotate position code logic block 21 in which the measured rotate position is transformed into a present rotate position code. The derived present rotate position code is in turn fed to a derived velocity code logic block 23 where the derived present rotate position code is compared with a prior rotate position code at a predetermined fixed frequency in order to derive rotate velocity information. The rotate velocity information is provided in the form of a code which is screened by a derived velocity code selector logic block 25 in order that only a selected or weighted portion of the derived velocity code is output to a velocity vs. position error comparator logic block 27.

The derived present rotate position code is also loaded into a rotate position error code logic block 13 which performs a subtraction operation in order to determine the distance and direction from the most recent present rotate position and the desired rotate position as indicated by the difference between the desired rotate position input code and the present derived rotate position code. The result of this subtraction operation is a rotate position error code which inputted to a velocity vs. position error logic block 27 along with a selected portion of the derived velocity code from logic block 25. The velocity vs. position error comparator logic block 27 compares the selected portion of the derived velocity code with the most recent position error code in order to solve the system servo equation and produce a pair of command signals which are received by a motor control logic block 29 to control the direction of drive current to the rotate motor 15.

During a print cycle, which is indicated by the presence of a GOF go flip flop signal, the above sequence of operations is repeated each time that the rotate position detector is strobed or monitored. In the preferred embodiment of the invention, a print cycle has a time duration of approximately 33 milliseconds providing a print speed of 30 characters per second. The rotate position detector operates at a 10KC frequency. This results in a fresh present rotate position code being generated every 100 microseconds. Thus, it can be seen that whenever the print head is to be rotated to a newly presented desired rotate position, the rotate motor velocity profile is controlled on a substantially continuable basis. Approximately 330 rotate position measurements, position error, and velocity computations and comparisons along with indicated change in direction of drive current all occur during a single 33 millisecond print cycle.

With a print cycle having a fixed time, the derived velocity code selector logic block 25 may change the degree of control or damping of the rotate motor velocity merely by selecting a different portion of the derived velocity code received from the derived velocity code logic block 23 at a predetermined point in the print cycle as the output shaft 17 of the rotate motor 15 approaches its destined rotate position.

The desired rotate position input logic block 11 includes input control logic 31, a destined position buffer 35, and a code converter 43 (FIG. 2). In the preferred embodiment of the present invention the input control logic 31 provides a four bit desired rotate position code in binary format which may emanate from a computer processor to the destined position buffer 35 via a four bit line 33. This four bit desired rotate position code is loaded into the destined position buffer 35 upon receipt of a PTOL/ synchronization signal on line 37 and a TJKD/ clock pulse on line 39. It is only during the TJKD/ clock pulse signal that the four bit desired rotate position code is known to be a valid code. This valid desired rotate position code is inputted to the code converter 43 via a pair 41 of parallel four bit lines 41.

The code converter 43 is employed to convert the four bit desired rotate position code, designated $R_nDR$, into a ten bit bit desired rotate position code designated $DRP_n$. The ten bit desired rotate position $DRP_n$ code is inputted to a position error adder 49 on a ten bit line 45. The position error adder 49 receives, along with the $DRP_n$ output from the code converter 43, another ten bit line 47 which carries present rotate position information designated $THETA_n$. The $THETA_n$ code is representative of the present rotate position, and is derived as explained hereinafter. THe $DRP_n$ desired rotate position code chosen to be output from the code converter 43 is the one's complement of the $THETA_n$ code for that position. The position error adder 49, which is part of the rotate position error code logic block 13 of FIG. 1 effectively performs a subtraction function in order to determine the difference between the desired rotate position and the $THETA_n$ present rotate position by adding the $DRP_n$ and $THETA_n$ codes together. The result of this addition by the position error adder 49 is seen on an eleven bit output line 51 which carries a $RPE_n$ rotate position error code representative of the distance remaining to be traveled to destination.

The position error adder 49 also provides a carry output on line 53 representative of the sign of the rotate position error. This output on line 53 is fed to an AND gate 55. A carry enable signal, labeled CE and generated as described later, is also provided as an input to the AND gate 55 via line 107. Therefore, when both the carry from the position error adder 49 is true or a logical one value along with a true or high CE carry enable signal, the output of the AND gate 55 provided on line 59 will also be true or a logical one value. A JK flip-flop 61 receives the output of the AND gate 55 at its J input. A 10MHZ clock signal is received by the JK flip-flop 61 on its CP clock input from line 107 along with a CW/ signal, standing for count window not, and generated as described later, at its reset terminal via line 91. A CARRY A output signal from the Q output of the JK flip-flop 61 is seen on line 67. This CARRY A output provides an indication of whether the position error is either positive or negative for a given count window.

The rotate motor output shaft 17 (FIG. 4) is directly coupled to the input shaft 68 of a resolver 69 by a coupling mechanism 66 such that the resolver input shaft 68 rotates in a one to one correspondence with the output shaft 17 of the rotate motor. The resolver 69 is a conventional brushless resolver employed as a position detector to measure the present angular position of the output shaft 17 of the rotate motor 15. In the prime embodiment of the invention a CR1093100 synchro resolver made by the Kearfott Division of Singer Corp., is employed. A reference 10KC sine wave is inputted to the rotor (not shown) of the resolver 69 via an input line 71. Rotate position information is fed out of the resolver 69 as sine wave signals RSVRS3 and RSVRS2 on lines 73 and 75 respectively from the stator (not shown) of the resolver 69.

The RSVRS2 and RSVRS3 sine wave signals from the resolver 69 are provided as an input to a phase shifter circuit 77 (FIG. 3) which combines and phase shifts these RSVRS2 and RSVRS3 signals in accordance with the amount of displacement of the resolver input shaft 68. The phase shifted sine wave output, designated PSSW, from the phase shifter circuit 77 is amplified by an amplifier 79 and squared by a square wave generator 81. The output from the square wave generator is a phase shifted square wave and, designated PSSQ, provides one input to a count window generator 83 via line 82.

The count window generator 83 receives, along with the PSSQ phase shifted square wave, a RSQ reference square wave on line 88 from the output of reference square wave generator 87. The reference square wave generator 87 receives as its input on line 85 the same 10KC sine wave signal that is also fed to the rotor of the resolver 69 (FIG. 4) on line 71. The count window generator 83, operating as a dual positive edge detector, produces a count window pulse designated CW and a corresponding CW/ count window not pulse whose width is proportional to the phase shift of the PSSQ phase shifted square wave from the square wave generator 81. The CW count window and CW/ pulses are generated by the count window generator 83 at a 10KC frequency.

A timing generator 95 (FIG. 3) receives the CW/ count window not signal on line 91 from the count window generator 83. Receipt of the CW/ signal initiates the operation of the timing generator 95 which in turn produces a plurality of timing signals designated CE, standing for carry enable, PE1/ and PE2/, standing for parallel enable 1/ and 2/ respectively. The CE carry enable signal is generated upon receipt of a fixed number of 10MHZ clock pulses by the timing generator 95 from the clock source 105 on line 107 after being enabled by the CW/ signal. The parallel enable signals PE1/ and PE2/, which are substantially identical, are generated after a certain number of 10MHZ clock pulses are received by the timing generator corresponding to a given time after the CE carry enable signal has been generated.

A present position counter logic block 109 (FIG. 3) is enabled by the CW count window signal on line 93 from the count window generator logic block 83. The present position counter 109, thereafter, proceeds to count 10MHZ clock pulses received on line 107 from a clock source 105. In the preferred embodiment of the invention a conventional ten megacycle clock source 105 is employed. The present invention counter 109 continues to count 10MHZ clock pulses until the CW signal enabling the counter is removed. Since the width of the CW count window signal is proportional to the angular displacement of the output shaft 17 of the rotate motor 15, the number of 10MHZ clock pulses counted by the present position counter 109 during a count window provides a numerical representation of the present rotate position of the rotate motor. This numerical representation of the rotate motor's angular displacement is taken as a ten bit $THETA_n$ code on present position counter output line 47. The present invention counter 109 is cleared after receipt of the PE1/ signal via line 97.

A prior position storage register 111 is simultaneously loaded or preset with the output of the present invention. counter 109 upon the next clock pulse after receipt of the PE2/ signal from the timing generator 95 on line 99. The prior position storage register 111 also receives the 10MHZ clock pulse on line 107 from the clock source 105. Thus, the output of the prior position storage register 111, which is designated $THETA_nL$, is equal to the $THETA_n$ code generated at the end of the previous count window.

The $THETA_n$ present rotate position code from the present position counter 109 is inverted by inverter 103 and fed to the B inputs of a velocity adder 115. The top bit $THETA_nL$ code which is the prior position code from the prior position storage register 111, is fed to the A inputs of the velocity adder 115 via a ten bit line 113. The velocity adder 115 continuously performs a difference operation. A seven bit $B_n$ derived velocity code designated B0, B1, B2, B3, B4, B5 and B6 is the result of the difference operation of the velocity adder 115.

Figure 3:
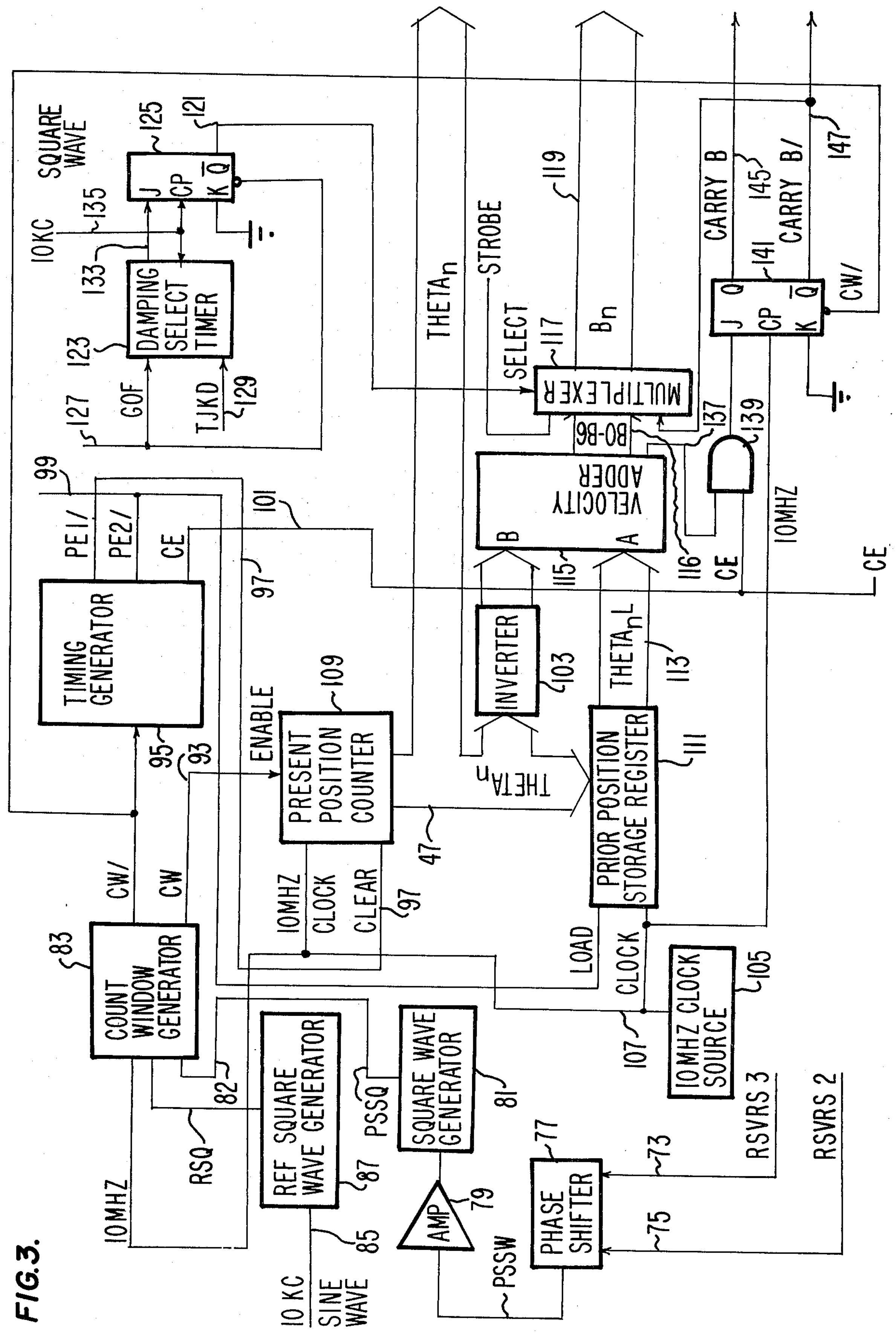
FIG. 3 is a logic block diagram of the derived rotate position code logic, derived velocity code logic, and derived velocity code selector of FIG. 1.

The velocity adder 115 may produce a carry output on line 137. In response to a carry signal on line 137 and a CE carry enable signal on line 101, an AND gate 139 provides an input to the J input of a JK flip-flop 141 (FIG.3). The JK flip-flop 141 receives a 10MHZ clock pulse at its CP clock pulse input via line 142 from the clock source 105. The JK flip-flop 141 is cleared upon receipt of a CW/ signal at its reset input from line 143. The bistable Q and $\overline{Q}$ outputs designated as CARRY B and CARRY B/ of the JK flip-flop 141 is provided on output lines 145 and 147 respectively. The CARRY B output is representative of the sign of the velocity error. The CARRY B/ output signal is merely at a state opposite to the CARRY B output.

The seven bit $B_n$ derived velocity code is fed from the velocity adder 115 to a multiplexer 117, via a seven bit line 116, along with the CARRY B/ signal via line 147 (FIG. 3). The multiplexer is employed to shift its output to more significant bits of the $B_n$ derived velocity code in response to receipt of a SELECT signal on line 121. The selected seven bit $B_n$ derived velocity code on the seven bit line 119 carrying its output from the multiplexer 117 therefore comprises either one set of chosen bits or another, depending on whether the SELECT line 121 is activated. Thus, a selected variable weight may be given to the $B_n$ derived velocity code.

The SELECT line 121 is activated by a damping select timer 123 and an associated JK flip-flop 125 (FIG. 3) at a predetermined time in the print cycle. The beginning of a print cycle is indicated by the presence of a high GOF go flip-flop signal. The damping select timer 123 is enabled by the presence of the GOF go flip-flop signal received from line 127 to commence counting 10KC square wave clock pulses received on line 135. When a predetermined number of 10KC square wave clock pulses corresponding to a predetermined duration of the print cycle are counted and the damping select timer 123 times out, a terminal count output pulse is produced on output line 133. The JK flip-flop 125, which also receives the ten KC square wave from line 135 at its CP clock pulse input is placed in a set state by the terminal count signal on line 133 from the damping select timer 123. This results in a low SELECT output pulse on line 121 from the $\overline{Q}$ output of the JK flip-flop 125. With a low select output signal appearing on line 121, the multiplexer outputs the second seven bit $B_n$ code comprising the more significant bits of the derived velocity code.

Thus, emphasis may be placed upon precise control of the rotate velocity profile for a substantial portion of the print cycle by exaggerating the velocity code being compared with the rotate position error. When sufficient time has elapsed in the print cycle that the desired rotate position is being approached, then the heavy damping of the rotate velocity may be released by alleviating the exaggeration of the velocity code.

A magnitude comparator 149 (FIG. 4) receives the $RPE_n$ position error code, representative of the distance to be traveled to destination on bit line 51. The magnitude comparator 149 also receives the CARRY A signal which represents the sign of the position error on line 67 from the position error adder 49. From bit line 119 the magnitude comparator 149 receives the $B_n$ derived velocity code as selected by the multiplexer 117. The CARRY B signal on line 145 provides the magnitude comparator 149 with an indication of the direction or sign of the selected weighted velocity code.

The CARRY B/ signal on line 147 completes the remaining least significant bits of the $B_n$ weighted velocity code with either all one's or all zeros depending on whether the CARRY B signal is at a logical binary one or binary zero value respectively.

The magnitude comparator 149 functions to determine whether the absolute value of the position error represented by the A inputs is greater than or less than the absolute value of the selected weighted velocity code represented by the B inputs; while at the same time accounting for the sign of the position error and the sign or direction of the selected weighted velocity code. The result of the comparison made by the magnitude comparator 149 is seen on magnitude comparator output lines 151 and 153. If the magnitude comparator determines that the binary value on its A inputs is greater than the binary value on its B inputs then an indication is provided by a A>B output signal on the magnitude comparator output line 151. Depending on the sign of the position error and the weighted velocity, the A>B output signal indicates that either the rotate motor should drive right or dynamically brake left. Conversely, if the magnitude comparator 149 decides that the binary value on the A inputs is less than the binary value on its B inputs, an indication of such a determination is provided by a A<B output signal appearing on line 153. Again, depending on the sign of the position error and weighted velocity, the A<B output signal indicates that either the rotate motor should drive left or dynamically brake right. If the binary value on the A inputs of the magnitude comparator 149 is equal to the binary value on its B inputs, then there is no output signal provided on either line 151 or 153.

An output buffer 155 (FIG. 4) receives an indication of the determination made by the magnitude comparator 149 from either the magnitude comparator output line 151 or 153. The output buffer 155 also receives a PE2/ parallel enable signal on line 99 and a 10MHZ clock signal on line 107. The output buffer 155 is loaded with the two bit output of the magnitude comparator 149 and 153 at the next clock pulse after the occurrence of each PE2/ signal on line 99. The output of the output buffer 155 is seen on a two bit line 161 coupled to an output enable gating logic block 163.

The output enable gating 163 is enabled by the GOF go flip-flop signal on line 159 which is present only during a print cycle. During the presence of a GOF go flip-flop signal the output enable gating 163 will output whenever binary information appears on the two bit line 161. Therefore, depending on the relative sign and value of the position error as compared with the sign and value of the selected weighted velocity code, an output is provided from the output enable gating 163 indicative of whatever compensation, if any, is to be made during a print cycle.

An RGR/ rotate go right output signal is seen on line 167 if the magnitude comparator 149 determines that the binary value on its A inputs is greater than the binary value on its B inputs. The RGR/ output signal indicates that either the rotate motor should drive right or brake left depending on the direction that the print head is traveling, as represented by the sign of the position error and velocity codes. Conversely, an RGL/ rotate go left output is seen on line 165 if the magnitude comparator 149 determines that the binary value on its A inputs is less than the binary value on its B inputs. The RGL/ output signal indicates that either the rotate motor should drive left or dynamically brake right depending on the direction of travel of the print head toward the destined character column. Again, if the binary value on the A inputs of the magnitude comparator 149 is equal to that on the B inputs, then there will be an absence of an output on both lines 165 and 167.

A predriver 169 amplifies the RGR/ or RGL/ signal received from the output gating 163 on line 165 or 167. during initiatlization of the printer, the rotate mechanism would be subject to damage should the drivers to the rotate motor be inadvertently activated as power is turned on or off. In order to safeguard against the rotate motor being inadvertently driven in either direction, the predriver 169 includes means for disabling the predriver output 173 during a machine initialization procedure as indicated by the occurrence of a low PORPR/ power-on reset signal on line 171.

The driver 175 further amplifies whatever output is received on line 173 from the predriver 169 to the level required for driving the rotate motor 15. The outputs of the driver 175 are provided on lines 177 and 179 as either RMDR1/ rotate motor drive right voltage signal or a RMDL1/ rotate motor drive left voltage signal if velocity profile compensation is indicated. The driver maintains the voltage output on either line 177 or line 179 such that a predetermined constant current in the direction indicated is maintained in the rotate motor.

The above description pertains to the overall operation and makeup of the digital logic and control system for the rotate motor 15. The individually functioning logic elements will now be discussed in more detail.

Figures 4, 5:
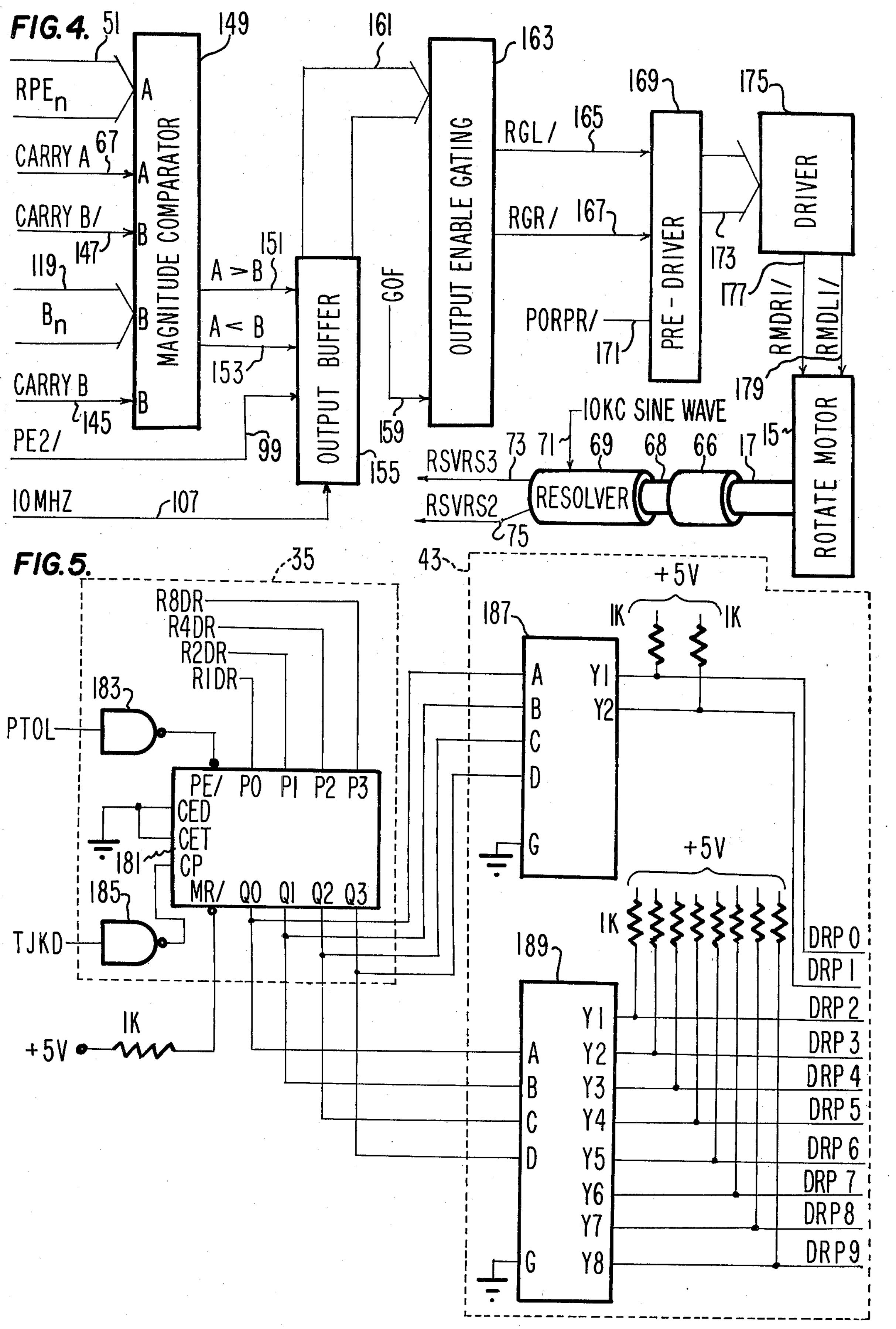
FIG. 4 is a logic block diagram of the velocity vs. position error logic, motor control block diagram, and rotate position detector of FIG. 1.
FIG. 5 is a detailed logic block diagram of the destined position buffer and code converter of FIG. 2.

Referring to FIG. 5, the details of the destined position buffer logic block 35 and code converter 43 are shown. The destined position buffer 35 comprises a four bit binary counter 181 which is employed as a latch and receives the destined rotate position code R1DR, R2DR, R4DR and R8DR on preset inputs P0, P1, P2 and P3 respectively. Sixteen unique rotate positions or character columns may be identified by a four bit binary code. The loading of the destined rotate position code $R_nDR$ is enabled by the occurrence of a PTOL signal which is inverted by a NAND gate 183 and then received at the PE/ parallel enable input of the four bit binary counter 181. The destined rotate position code $R_nDR$ is known to be valid upon the occurrence of a TJKD pulse, received at the CP clock pulse input of the four bit binary counter 181 after being inverted by a NAND gate 185 once the counter 181 has been enabled. The Q0 through Q3 parallel outputs of the four bit binary counter 181 address two read only memory devices 187 and 189, hereinafter designated ROM, in parallel. The ROMs 187 and 189 comprise the code converter 43 employed to produce the destined rotate position code designated $DRP_n$.

In the preferred embodiment of the invention, each of the ROM devices 187 and 189 comprises a 256 bit monolithic transistor-transistor read only memory organized as a 32 × 8 bit word, wherein only the bytes of information corresponding to the address locations 0–15 are significant. All inputs to the ROMs 187, 189 are preferably DTL/TTL compatible.

The content of the ROM 187, for all of its significant address locations, is shown in FIG. 6A in the ROM Table One. Similarly, the significant content of ROM 189 is shown in FIG. 6B in ROM Table Two. It is to be noted that the address bit labeled A in ROM Table One is the least significant bit of the composite address, while the address bit labeled D in ROM Table Two is the most significant bit. The outputs of the ROM Table One and Table Two are combined to form the ten bit destined position code designated $DRP_n$. The least significant output bit of the composite $DRP_n$ code is the Y1 output bit of the ROM 187 as provided in ROM Table One. The most significant output bit of the $DRP_n$ code is the Y8 output of the ROM 189 as defined in ROM Table Two. The ROM Table One output Y1 corresponds to the destined rotate position code bit DRP0 (FIG. 5) while the Y2 output from ROM Table One corresponds to destined rotate position code bit DRP1. Similarly, the ROM Table Two output bit positions Y1 through Y8 correspond to destined rotate position code bits DRP2 through DRP9.

In the preferred embodiment of the invention 16 print head character columns (FIG. 7) are provided about the circumference of the print head. The individual print head character columns are each identified by a unique $R_nDR$ desired rotate position input code as shown in FIG. 7. Also, associated with the individual print head character columns are $THETA_n$ present position codes which are identified in FIG. 7 by the decimal equivalent to the binary code which is actually the one's complement of the $DRP_n$ codes output from the ROMs 187 and 189 (FIG. 5). Hence, if the character desired to be printed is located in the print head character column of the far left as seen in FIG. 7, then the $R_n$DR four bit binary code addressing the ROMs 187 and 189 would be as shown in FIGS. 6A and 6B at the D through A inputs respectively. The equivalent for this binary code is shown in FIG. 7 to be a decimal 7. The $DRP_n$ destined rotate position code associated with the character column 7 formed by combining the ROM Tables One and Two in FIGS. 6A and 6B would be 1110010110, which is the binary notation corresponding to the decimal value 918. This $DRP_n$ code was chosen as it is the one's complement of the $THETA_n$ present rotate position code 0001101001 associated with character column 7. The decimal equivalent for this binary $THETA_n$ present position rotate code, as illustrated in FIG. 7 is 105.

Thus, it can be seen that three unique binary codes are associated with each print head character column. The $DRP_n$ destined rotate position code is necessary for calculating the rotate position error code. The $THETA_n$ present position code is necessary for calculating the rotate position error code and also for deriving the velocity code. Employing the one's complement of the $THETA_n$ code for the $DRP_n$ code facilitates the difference operation performed by the position error adder 49 and obviates a bit by bit inversion of the $THETA_n$ code.

The above detailed description of the preferred embodiment of the invention as illustrated in FIGS. 5 to 7, relates primarily to the various individually functioning logic elements and means employed for inputting a valid destined rotate position code to the rotate logic and control system in a pure binary format that will facilitate a subtraction operation. The following portion of the digital logic and servo system for the print head rotate control will now be described in detail including the other various individually functioning logic elements and means employed for deriving velocity and calculating position information in pure binary format from the output of a resolver, while at the same time obviating the use of a tachometer.

Figure 8:
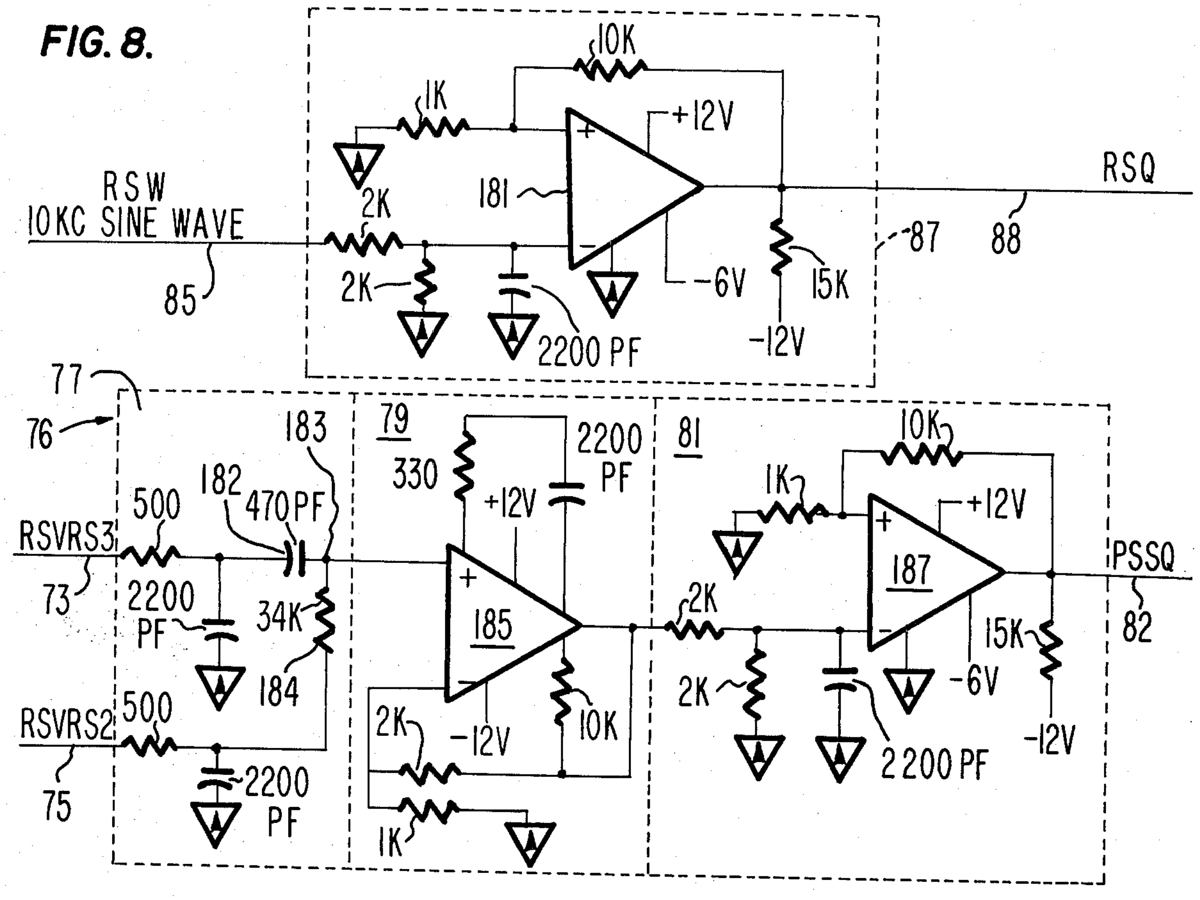
FIG. 8 is a circuit diagram of the reference square wave generator and phase shifted square wave generator of FIG. 3.

Referring now to FIG. 8, the reference square wave generator 87 and the phase shifted square wave generator, generally referred to as 76, are shown in detail. The 10KC sine wave signal which is provided as an input to the resolver 69 on line 71 (FIG. 4) is also provided as an input to the square wave generator 87 on line 85 (FIGS. 3 and 8), which is coupled to the negative input of a differential amplifier 181. The output of the differential amplifier 181 is taken on line 88 and is referred to as a RSQ reference square wave signal. The RSQ signal on line 88 is received as one of the inputs to the count window generator 83 (FIG. 3) which will be explained in more detail hereinafter.

The RSVRS2 signal, which is output from the resolver 69 on line 75 (FIG. 4), is provided as one of two inputs to the phase shifted square wave generator circuit 76 (FIGS. 3 and 8). The second input to the phase shifted square wave generator circuit 76 is the RSVRS3 output signal from the resolver 69 provided on line 73. The first stage of the phased shifted wave generator circuit 76 comprises a phase shifter circuit 77 (FIG. 8) which combines the RSVRS2 and RSVRS3 signals into a single phase shifted signal at the common junction 183 of a 470PF capacitor 182 and a 34K resistor 185 (FIG. 8). These precise values have been chosen for the capacitor 182 and resistor 184 coupled together at junction 183 in order to match their impedance at the operating frequency of 10KHZ. Matching the impedance of the capacitor 182 and the resistor 184 is necessary in order to insure that the phase shifted signal at junction 183 is directly proportional to the actual angular displacement of the rotate motor output shaft. At other frequencies the component values for the capacitor 182 and resistor 184 would have to be selected such that their impedances would remain matched in order to keep the phase shift at junction 183 directly proportional to the actual angular displacement of the rotate motor.

The phase shifted sine wave designated PSSW at junction 183 is coupled to the positive input of a differential amplifier 185 which is part of the amplifier portion 79 of the phase shifted square wave generator circuit 76. The output from the differential amplifier 185 is in turn coupled to the negative input of the differential amplifier 187 which is included in the square wave generator stage 81 of the phase shifted square wave generator 76. The output of this differential amplifier 187 is taken on line 82 as the PSSQ phase shifted square wave pulse whose phase shift is directly proportional to the angular displacement of the input shaft 68 (FIG. 4) of the resolver 69 and therefore directly proportional to the angular displacement of the rotate motor output shaft 17.

Figure 9:
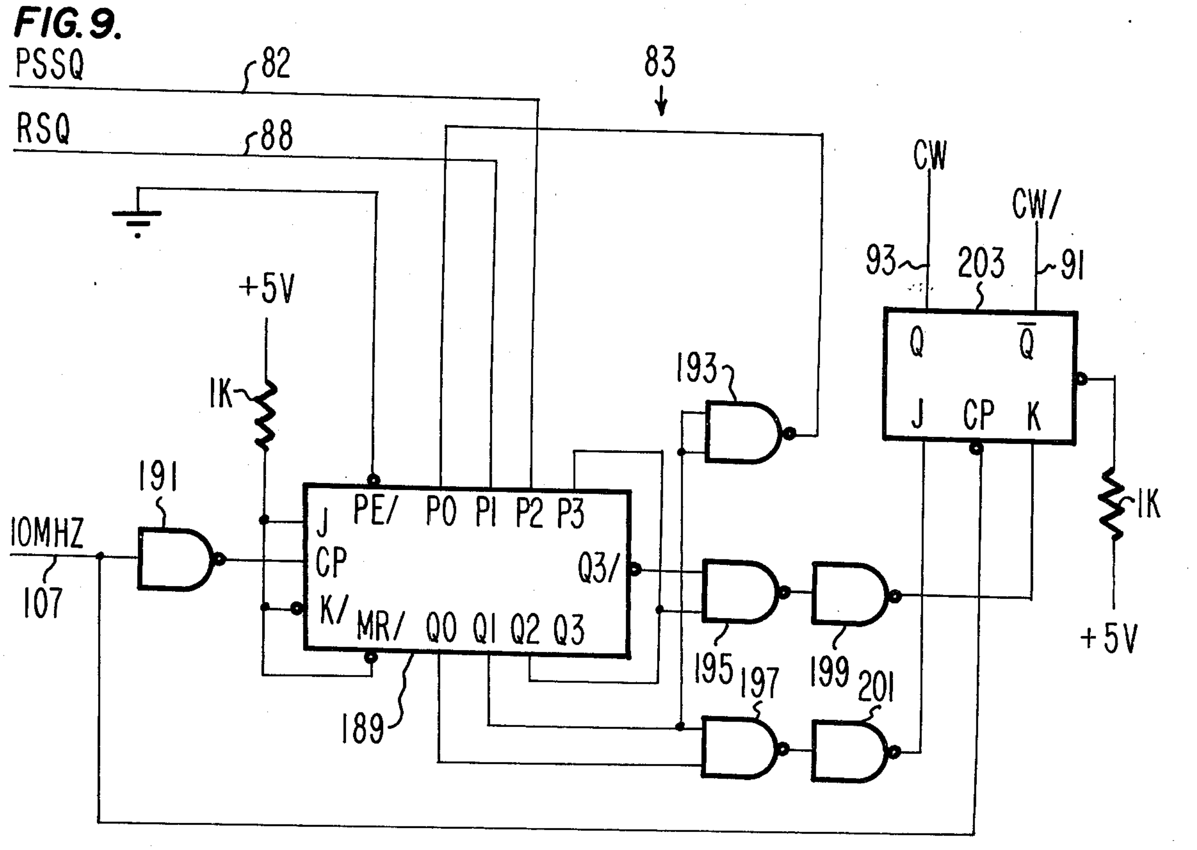
FIG. 9 is a detailed logic block diagram of the count window generator of FIG. 3.

The RSQ reference square wave signal is provided on line 88 to the P1 parallel input of a four bit shift register 189 which is employed in a dual positive edge detector or count window generator, generally referred to as 83 (FIG. 9). The PSSQ phase shifted square wave signal is provided on line 82 as an input to the P2 parallel input of the four bit shift register 189. The four bit shift register 189 receives the 10MHZ clock pulse from the 10MHZ clock source 105 (FIG. 3) via line 107 after being inverted by a NAND gate 191 at its CP clock pulse input. A NAND gate 193 is coupled between the Q1 outputs of the four bit shift register 189 and its P0 parallel input. The PE/ parallel enable input to the shift register 189 is grounded. A second NAND gate 195 receives as inputs the Q2 and Q3/ outputs of the four bit shift register 189. Therefore, the output of the NAND gate 195 will remain a binary one value until both the Q2 and Q3 outputs of the four bit shift register 189 are simultaneously at binary one values.

When both the Q2 and Q3/ outputs of the four bit shift register 189 are high at the same time, then the output of the NAND gate 195 is a binary zero value. The output of the NAND gate 195 is coupled to the K input of the JK flip-flop 203 after being inverted by a NAND gate 199. A NAND gate 197 receives as its two inputs the Q0 and Q1 outputs from the four bit shift register 189. Thus, the output of the NAND gate 197 will remain a binary one value until such time as both inputs are simultaneously at a binary one value. Then the NAND gate 197 output becomes a binary zero value. The output of the NAND gate 197 is coupled to the J input of the JK flip-flop 203 after being inverted by a NAND gate 201. The Q2 output of the four bit shift register 189 is fed back to its P3 parallel input. The JK flip-flop 203 receives at its CP clock pulse input the ten megacycle clock pulse provided on line 107. The Q and $\overline{Q}$ bistable outputs of the JK flip-flop 203 provided on lines 93 and 91 are designated CW count window and CW/ count window not signals, respectively. A CW pulse, along with a corresponding CW/ pulse, is generated by the JK flip-flop 203 being set and later reset. The width of this CW count window pulse is directly proportional to the angular position of the rotate motor output shaft.

Figure 10:
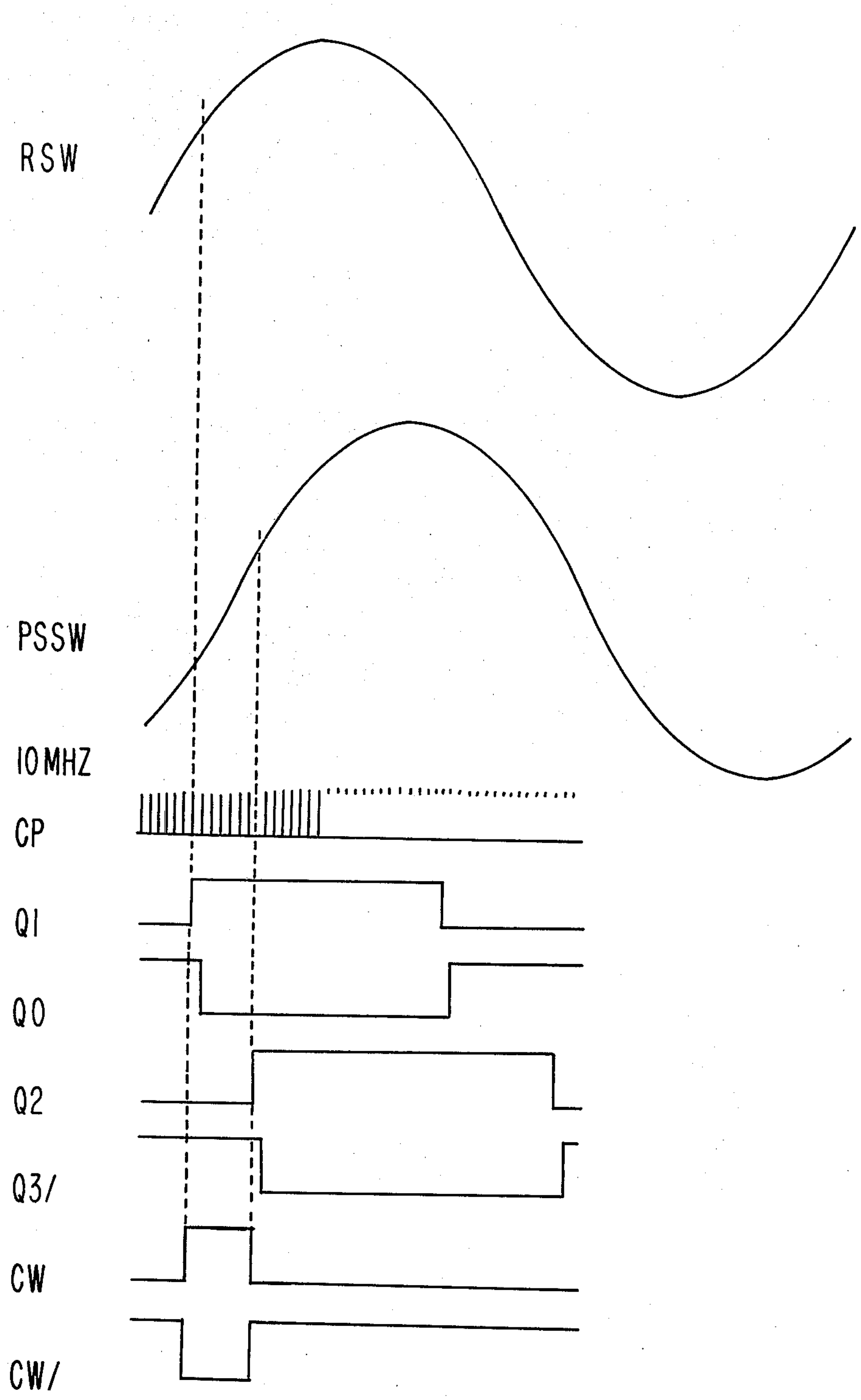
FIG. 10 is a timing waveform diagram illustrating the generation of a count window.

A timing waveform diagram (FIG. 10) illustrates the timing involved in the generation of a count window by the count window generator 83 (FIG. 3 and FIG. 9). When the RSW reference sine wave signal crosses zero and becomes positive, a high RSQ reference square wave signal is generated by the reference square wave generator 87 on output line 88. This high RSQ signal received on the P1 parallel input of the four bit shift register 189 results in a high Q1 output pulse at the next clock pulse signal received at its CP clock input (FIG. 10). Since the high Q1 signal is inputted to the NAND gate 197 while the Q0 output signal is still high, both inputs to the NAND gate 197 are coincidentally high. While both inputs to the NAND gate 197 are high, its output is low. The low output of the NAND gate 197 is inverted by the NAND gate 201 whose high output is seen at the J input to the JK flip-flop 203. The next clock signal received from line 107 at the CP clock pulse input of the JK flip-flop 203 results in it being set and its Q output going to a high value thereby producing a high CW clock window signal on line 93. The Q1 high output of the shift register 189 is inverted by the NAND gate 193 and fed back to the P0 parallel input of the four bit shift register 189 as a low signal. Therefore, on the succeeding clock pulse the Q0 output will go to a low value. With the Q1 input to the NAND gate 197 high, while the Q0 input to the NAND gate 197 is low, a high output is provided by the NAND gate 197. This high output is inverted by the NAND gate 201 and therefore seen as a low signal by the J input of the Jk flip-flop 203. However, the JK flip-flop 203 remains latched in the set state until a high is seen at its K input.

This CW signal remains high until the PSSW phase shifted sine wave signal at junction 183 (FIG. 8) crosses zero and produces a high PSSQ phase shifted square wave signal on line 82 from the phase shifted square wave generator circuit 76. This high PSSQ signal is received from line 82 at the P2 parallel input of the four bit shift register 189 and results in a high Q2 output. This high Q2 output is provided as one input to the NAND gate 195. Therefore, at the clock pulse after the Q2 output goes high, and before the Q3/ output goes low, the output of the NAND gate 195 goes low. This low output of the NAND gate 195 is inverted by the NAND gate 199 and provided as a high input to the K input of the JK flip-flop 203 resulting in it being reset and its Q output going low while at the same time its $\overline{Q}$ output goes high. Thus, a CW count window pulse is produced, along with a complementary CW/ count window not pulse, whose width is defined by the number of clock pulse signals received by the four bit shift register 189 between the time that the RSW reference sine wave signal and the PSSW phase shifted sine wave signal becomes positive.

The High Q2 output is also fed back as a high input to the P3 parallel input of the four bit shift register 189 in order that the Q3/ output may go low on the next clock pulse. The shift register 189 is prepared to generate a new CW and complementary CW/ pulse by the feedback from the NAND gate 193 when the RSW reference sine wave signal crosses zero and becomes negative, resulting in a low RSQ signal from line 88 at P1 parallel input. Further preparation for the next CW pulse to be generated includes feedback from the Q2 output to the P3 parallel input when the PSSW phase shifted sine wave becomes negative resulting in a low PSSQ signal from line 82 at the P2 parallel input.

The timing generator 95 (FIG. 11) includes a four bit binary counter 207 which receives the CW/ count window not signal from the count window generator 83 via line 91 at its PE/ parallel enable input. The four bit binary counter 207 also receives the ten megacycle clock pulse at its CP input from the clock source 105 on line 107. The PO, P1, P2 and P3 parallel inputs to the four bit binary counter 207 are grounded. Therefore, the four bit binary counter 207 is preset to zero at the next clock pulse after it receives a low CW/ pulse. The Q0, Q1 and Q2 parallel outputs of the four bit binary counter 207 are connected to the three inputs of two NAND gates 209 and 211. The Q0 and Q1 outputs of the four bit binary counter 207 are also provided as inputs to a NAND gate 213. The output of the NAND gate 211 is provided as the third input to the NAND gate 213. A NAND gate 217 inverts the output of the NAND gate 213. The Q3 output of the four bit binary counter 207 is fed back to its CEP count enable parallel input after being inverted by a NAND gate 208. Both the CEP count enable parallel and the CET count enable trickle inputs must be high to enable the counter 207 to count clock pulses. With the P3 parallel input preset to zero, the resulting low at the Q3 output of the four bit binary counter 207 is inverted by the NAND gate 208 and fed back to CEP input as a high. The counter 207 is thus enabled by the high signal at its CEP input.

Figure 12:
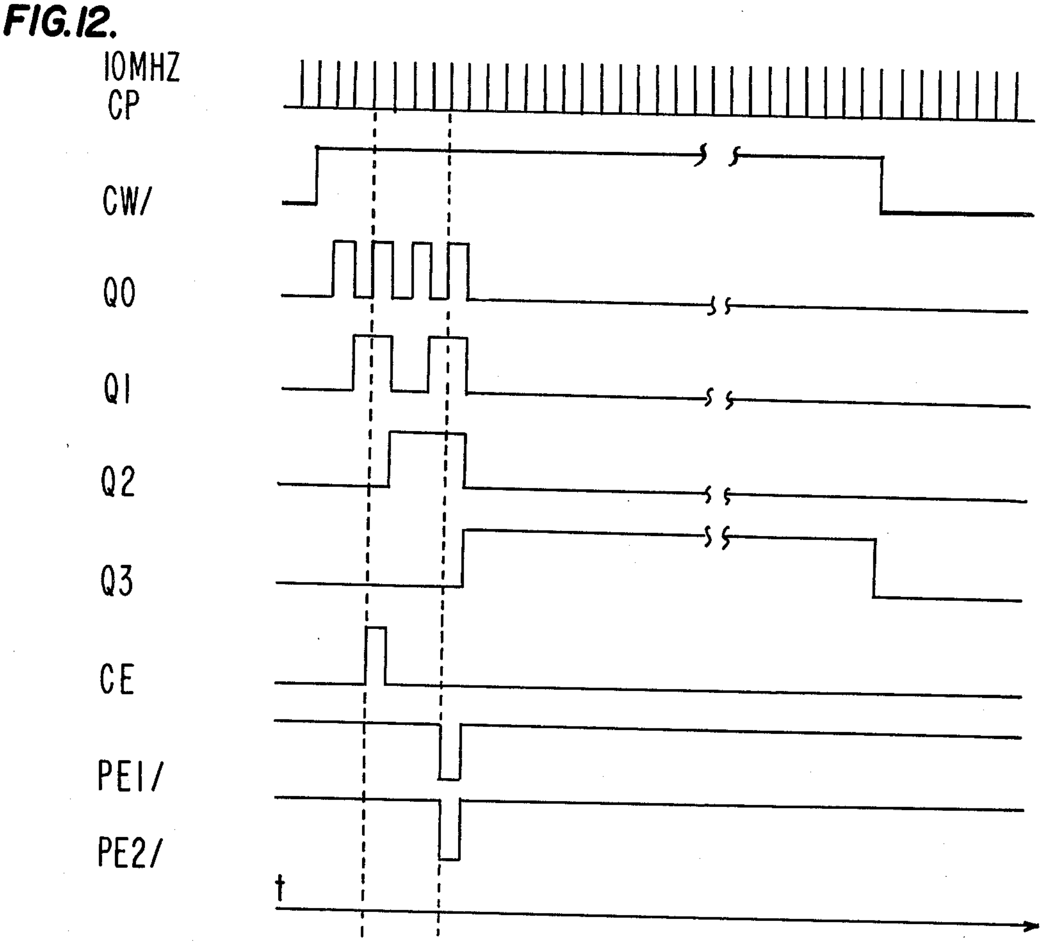
FIG. 12 is a timing diagram illustrating the generation of timing pulses by the detailed logic of FIG. 11.

Referring to FIG. 12, it can be seen that one clock pulse after a CW/ signal becomes high, a high or binary one value output is seen at its Q0 output of the four bit binary counter 207. However, since outputs Q1 and Q2 are still low, or binary zero values, the output of the NAND gates 209, 211 and 213 will remain high or at binary one values. At the third clock pulse after the binary counter 207 has been enabled, both the Q0 and Q1 outputs will be high. Since the Q2 output is still low, or a binary zero value, the output of the NAND gate 211 remains at a high or binary one value. Since the output of the NAND gate 211 is provided as an input to the NAND gate 213 along with the Q0 and Q1 outputs, and all three inputs to the NAND gate 213 are then high, its output will go low to a binary zero value. This low output pulse is inverted by the NAND gate 217 and as seen in FIG. 12, becomes a high CE pulse, standing for carry enable, having a width of one clock time.

Seven clock pulses after the CW/ signal goes high (FIGS. 11 and 12) the Q0, Q1 and Q2 outputs of the binary counter 207 are all at a high or binary one value. Since then, the three inputs to the NAND gates 209 and 211 are all high, their output becomes low or a binary zero value. A low or binary zero PE1/ signal is then seen on line 97. A low or binary zero value PE2/ signal likewise appears on line 99. With the output of the NAND gate 211 becoming low, one input to the NAND gate 213 also becomes low and therefore its output remains the same. On the next clock pulse the Q0, Q1 and Q2 outputs all go low and therefore the outputs of NAND gates 209 and 211 return to binary one values. Thus, it can be seen that a CE carry enable pulse (FIG. 12) is generated three clock pulses after the CW/ count window not signal goes high. Also, it can be seen that substantially identical PE1/ and PE2/ pulses of a one clock time duration are generated seven clock pulses after the CW/ signal goes low. The significance of these timing signals will become more apparent as explained hereinafter.

When eight clock pulses have been counted by the four bit binary counter 207, its Q3 output goes high. This high Q3 output is inverted by the NAND gate 208 and seen as a low signal at the CEP input to the counter 207. This inhibits further counting, thereby preventing the generation of spurious timing signals. The four bit binary counter 207 remains thus inhibited until it is later cleared or preset to zero by the next low CW/ count window not signal.

The present position counter generally referred to as 109 comprises (FIG. 13) in the preferred embodiment of the invention, a plurality of four bit binary counters 219, 221 and 223. Each of these three binary counters have their CP input connected in common and with the clock source 105 by line 107. The four bit binary counters 219, 221 and 223 also have their PE/ input connected in common and to line 97 in order to receive the PE1/ timing signal from the timing generator 95. The CW count window pulse from the count window generator 83 is provided via lines 93 to the CET input to the counter 219 and also to the CEP input of the counters 221 and 223. Therefore, counter 219 which has its CEP input maintained at a high signal, is inhibited from counting until a high CW count window signal is also received at its CET count enable trickle input. The PO, P1, P2 and P3 parallel inputs of the counters 219, 221 and 223 are all connected to ground so that they may be preset to zero at the receipt of a low PE1/ timing signal.

The TC terminal count output of counter 219 is connected to the CET input of counter 221. Thus, the counter 221 is inhibited from counting until it receives a high CW count window signal at its CEP input and simultaneously receives a high TC terminal count signal and its CET input from the TC output of the counter 219. Likewise, the TC output of the counter 221 is coupled to the CET input of counter 223 so that it may be enabled when the counter 221 reaches its terminal count. It then remains enabled as long as the CW signal remains high. The output signals produced at the Q0 through Q3 outputs of the counter 219 are labeled THETAO through THETA3, respectively. The signals produced at the Q0 to Q3 outputs of the counter 219 are labeled THETA4 through THETA7, respectively. The output signals seen at the Q0 and Q1 outputs of the counter 223 are labeled THETA8 and THETA9, respectively.

The binary counter 219 of the present position counter 109 commences counting 10 megacycle clock pulses from the clock source 105 after it has been enabled by a high CW count window signal. The binary counter 219 continues counting clock pulses until it reaches its terminal count, thereby producing a high TC signal from its TC output.

The binary counter 211 commences counting the 10MHZ clock signal on line 107 after being enabled by the high TC signal produced by the counter 219. The binary counter 221 continues counting clock pulses until either it reaches its terminal count or the CW count window signal goes low. The binary counter 223 operates in the same fashion as counter 221. The binary value of the present position counter 109 is therefore directly proportional to the number of clock pulses occurring during a given count window. This binary value is provided at the Q0 through Q3 output of the four bit binary counters 219, 221 and 223 as the ten bit $THETA_n$ code. It should be noted that since the present position counter 109 counts 10MHZ clock pulses during a 10KC count window, a fresh present position code $THETA_n$ which may have a binary value as high as one thousand is generated every 100 microseconds.

Figure 13:
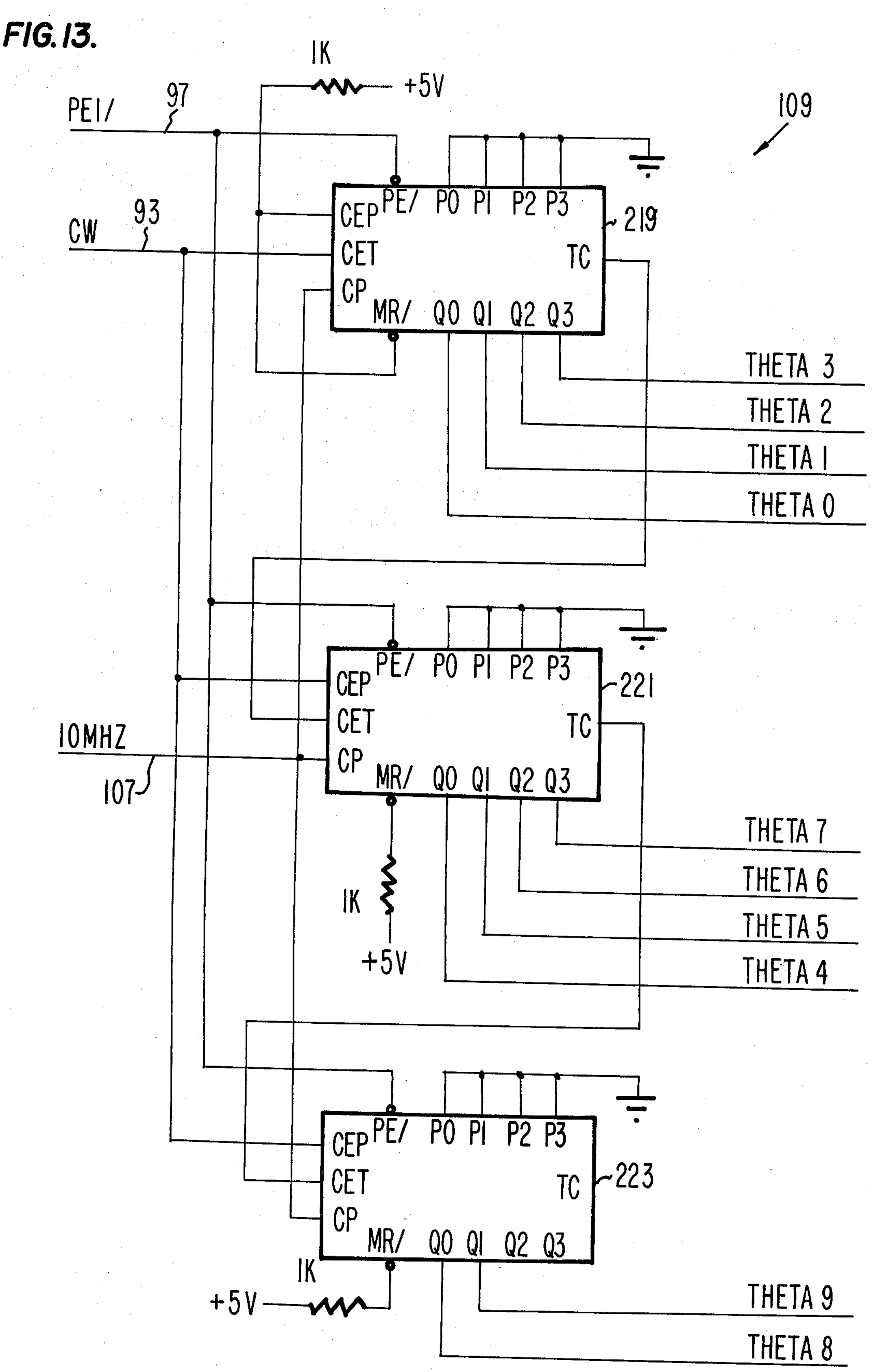
FIG. 13 is a detailed logic diagram of the present position counter of FIG. 3.
Figure 14:
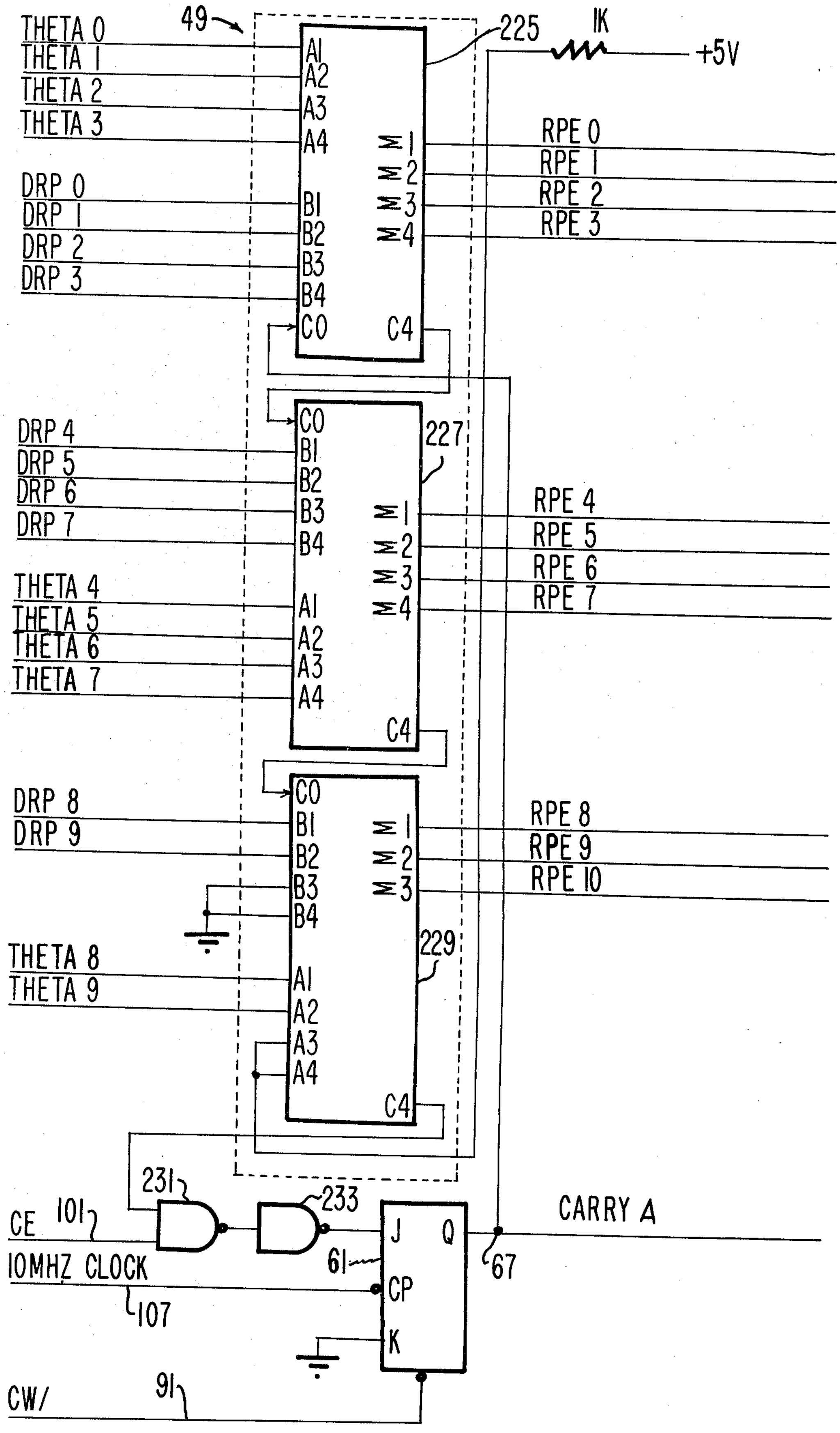
FIG. 14 is a detailed logic diagram of the position error adder of FIG. 2.

The position error adder, generally referred to as 49, comprises a plurality of four bit adders 225, 227 and 229 arranged as shown in FIG. 14. The four bit adders 225, 227 and 229 receive on their A inputs the $THETA_n$ signals from the four bit binary counters 219, 221 and 223 respectively (FIG. 13). The four bit adders 225, 227 and 229 receive on their B inputs the $DRP_n$ signals from the ROMS 187 and 189 (FIG. 5).

The C4 carry output of the four bit adder 225 is coupled to the CO carry input of the four bit adder 227. Similarly, the C4 carry output of the four bit adder 227 is coupled to the CO carry input of the four bit adder 229.

The C4 carry output of adder 229 is provided as one of two inputs to a NAND gate 231 (FIG. 14) which receives as its other input the CE carry enable signal from the timing generator 95 (FIG. 3 and FIG. 11) via line 101. The output of the NAND gate 231 is received on the J input of a JK flip-flop 61 after being inverted by a NAND gate 233. The JK flip-flop 61 has its K input grounded and receives at its CP clock pulse input the ten megacycle clock pulse on line 107 from the clock source 105. The JK flip-flop 61 is reset upon receipt of a low CW/ count window not pulse, on line 91 from the count window generator 83 (FIGS. 3 and 9). The bistable output of the JK flip-flop 235 is taken at its Q output on line 67 and is designated as a CARRY A signal. This CARRY A output is fed back to the CO carry input of the four bit adder 225. The adders 225, 227 and 229 (FIG. 14) perform a binary addition of the $DRP_n$ and $THETA_n$ codes in order to obtain the difference between the destined rotate position and the current present rotate position. The result is provided on the sigma outputs of the adders 225, 227 and 229 as an eleven bit $RPE_n$ rotate position error code. It should be noted that RPEO is the least significant bit and that RPE10 is the most significant bit of the $RPE_n$ code. The adders 225, 227 and 229 operate on a continuous basis. While the $DRP_n$ code remains constant during a print cycle, the $THETA_n$ code is dynamically updated upon each occurrence of a high CW count window signal. The CARRY A output on line 67 provides an indication of the sign of the $RPE_n$ rotate position error code. For example, let us assume that the destined rotate position code corresponds to the $R_n$DR8 input code as illustrated in FIG. 7. The $DRP_n$ code for this rotate position as set forth in FIG. 7 is a decimal 128 and a binary 0010000000. Let us further assume that the present rotate position is that of the character column shown on the far left in FIG. 7. The $THETA_n$ code corresponding to this print head character column is a decimal 105 and a binary 0001101001. The result obtained on the sigma output of the four bit binary adders 225, 227 and 229 after adding these $DRP_n$ and $THETA_n$ codes together, would be an eleven bit $RPE_n$ code of 10011101001 from the RPE10 to the RPE0 bits respectively. The C4 output from the adder 229 would be a binary zero. This low input from the C4 carry output of adder 229 to the NAND gate 231 maintains the output of this NAND gate 231 at a high value when it receives a high CE carry enable pulse on line 101. The high output of the NAND gate 231 is inverted by the NAND gate 233 and seen as a low signal by the J input of the JK flip-flop 61. Therefore, on the next 10MHZ clock pulses received on the CP input of the JK flip-flop 61, no change of state occurs. Therefore, the CARRY A signal on line 67 from the Q output of the JK flip-flop 61 remains a binary zero value. This low CARRY A signal is fed back to the CO carry input to the least significant adder 225. This low CARRY A signal further indicates that the direction of the rotate position error as seen in FIG. 7, is from left to right. Conversely, it can be seen that if the destined print head character column is to the left of the present rotate position as seen in FIG. 7, that the CARRY A signal will become a binary one value.

Figure 11:
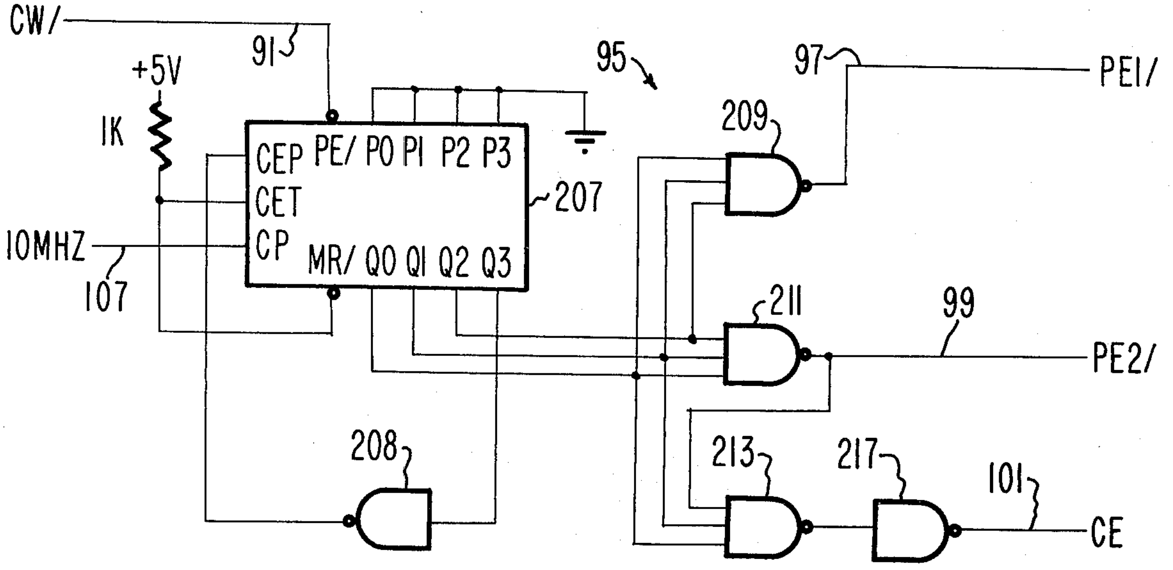
FIG. 11 is a detailed logic diagram of the timing generator of FIG. 3.

It will be remembered that the present position counter generally referred to as 109 in FIG. 13 does not generate a new THETA$_n$ code until a PE1/ signal has been generated by the timing generator 95 and the CW signal goes high (FIGS. 3 and 11). It will be further remembered that the CE carry enable signal is generated three clock pulses before the PE1/ timing signal. Thus, sufficient time is provided for an update of the CARRY A signal before the next THETA$_n$ code is generated. The eleven bit RPE$_n$ rotate position error code and the CARRY A signal are both fed to the magnitude comparator 149 (FIG. 4) on bit lines 51 and 67, respectively, as is further explained hereinafter.

Figure 15:
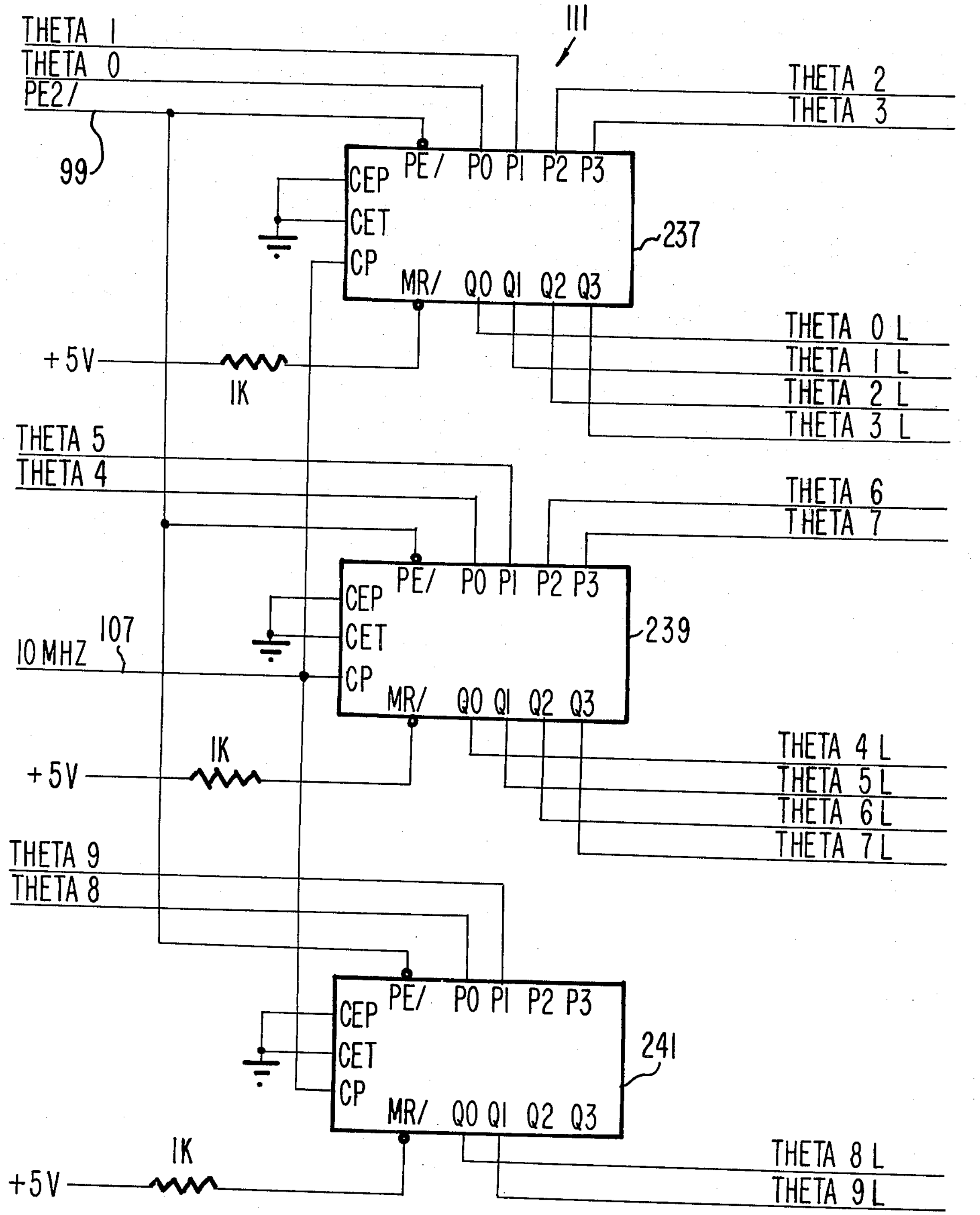
FIG. 15 is a detailed logic diagram of the prior position storage register of FIG. 3.

Meanwhile, the THETA$_n$ code from the four bit binary counters 219, 221 and 223 (FIG. 13) forming the present position counter 109 (FIG. 3) is also fed to the prior position storage register generally referred to as 11 in FIG. 15, which comprises a plurality of four bit binary counters 237, 239 and 241 (FIG. 15) having their CP clock pulse input connected in common and to the ten megacycle clock pulse source 105 by line 107. The four bit binary counters 237, 239 and 241 have all their PE/ parallel enable inputs also connected in common and to line 99 for receiving the PE2/ timing pulse from the timing generator 95 for loading the counters in parallel. Since the CEP and CET inputs to each of the four bit binary counters 237, 239 and 241 are grounded, the counters operate as storage registers whose contents is the binary information loaded via their parallel inputs at the occurrence of the next clock after a PE2/ timing pulse.

The four bit binary counter 237 receives on its PO through P3 parallel inputs the portion of the present position rotate code designated THETA0 through THETA3. The four bit binary counter 239 receives on its PO to P3 inputs the portion of the present rotate position code designated THETA4 through THETA7. The four bit binary counter 241 receives on its PO and P1 inputs THETA8 and THETA9. The four bit binary counters 237, 239 and 241 are loaded in parallel with the THETA$_n$ present rotate position code existing at the occurrence of the next clock after a high PE2/ timing pulse is received from line 99. Thus, a THETA$_n$L prior position code is provided on the Q outputs of the counters 237, 239 and 241 (FIG. 15) representative of the rotate position code during the immediately preceeding count window. While this THETA$_n$L code is updated at the occurrence of each PE2/ timing pulse, it provides a basis for comparison between the present and past rotate positions even while fresh present rotate positions are being calculated.

Figure 16:
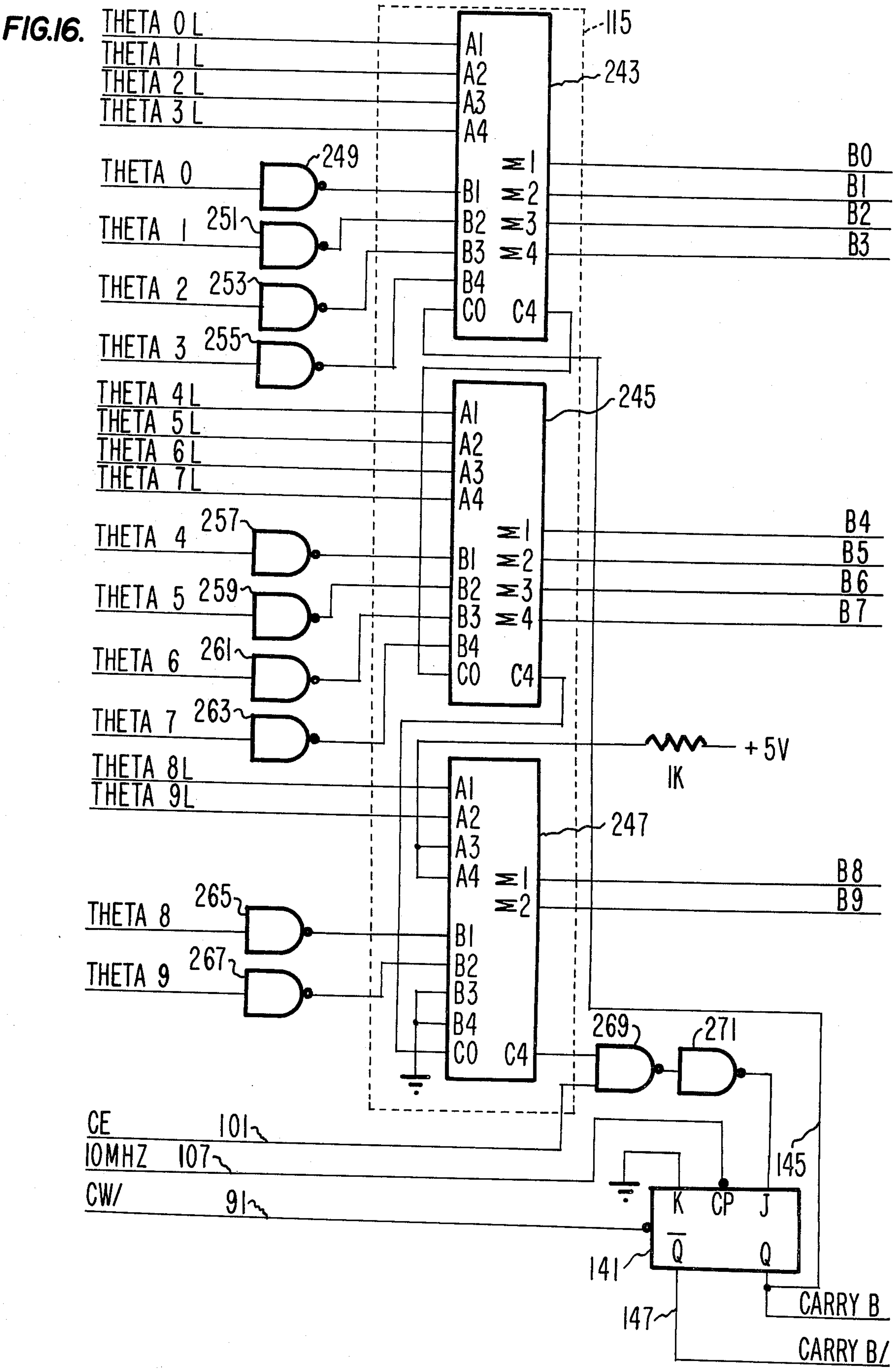
FIG. 16 is a detailed logic diagram of the velocity adder of FIG. 3.

The velocity adder 115 comprises a plurality of four bit adders 243, 245 and 247 arranged as shown in FIG. 16. The THETA$_n$L information from the four bit binary counter 237 (FIG. 15) of the prior position register 111 is received by the least significant four bit adder 243 on its A inputs. The THETA$_n$ information from the four bit binary counter 219 (FIG. 13) is received on the B inputs of the four bit adder 243 after being inverted bit by bit by NAND gates 249, 251, 253 and 255. The four bit adder 243 performs a binary addition of this portion of the THETA$_n$L prior rotate position code and the one's complement of this portion of the THETA$_n$ present rotate position code. The difference is indicated on the sigma outputs of the adder. The sigma one through sigma four outputs of the four bit adder 243 are designated as velocity code bits BO through B3, respectively. The C4 carry output of the four bit adder 243 is fed to the CO carry input of the four bit adder 245.

The four bit adder 245 receives the THETA$_n$L information on its A inputs from the four bit binary counter 239 (FIG. 15). At its B inputs the four bit adder 245 receives the THETA$_n$ information from the four bit binary counter 221 after being inverted bit by bit by NAND gates 257, 259, 261 and 263. The sigma one to sigma four outputs of the four bit adder 245 are designed as velocity code bits B4 through B7, respectively. The C4 carry output of the four bit adder 245 is coupled to the CO input of the four bit adder 247.

The most significant four bit adder 247 receives on its A1 and A2 inputs the THETA$_n$L information from the four bit binary counter 241. On its B1 and B2 inputs the four bit adder 247 receives the THETA$_n$ information from the four bit binary counter 223 after being inverted by NAND gates 265 and 267 respectively. The sigma one and sigma two outputs of the four bit adder 247 are designated as velocity code bits B8 and B9 respectively. The C4 carry output from the four bit adder 247 is provided as one input to a NAND gate 269 (FIG. 16) which receives as its other input the CE carry enable signal from the timing generator 95 on line 101. The logical output from the NAND gate 269 is fed to the J input of a JK flip-flop 273 after being inverted by a NAND gate 271. The JK flip-flop 273 receives at its CP clock pulse input the ten megacycle clock pulse input from clock pulse source 105 (FIG. 3) on line 107. The K input to the JK flip-flop 273 is grounded. The JK flip-flop 273 is reset by a low CW/ count window not signal from the count window generator 83 provided on line 91. The signal at the Q output of the JK flip-flop 273 is designated CARRY B and is also fed back to the CO carry input of the four bit adder 243 from output line 145. The signal at the $\bar{Q}$ output of the JK flip-flop 273 provided on output line 147 is designated CARRY B/.

Thus, the four bit adders 243, 245 and 247 receive at THETA$_n$L past position code along with the one's complement of the THETA$_n$ present rotate position code in order to derive a B$_n$ velocity information code. Velocity information may thus be derived even though the only inputs to the velocity adder 115 (FIG. 3) are rotate position information in that both the past position and present position information codes are updated at constant and identical increments of time, namely, 100 microseconds, as previously explained. The CARRY B and CARRY B/ signals provide an indication of the sign and direction of the derived B$_n$ rotate velocity code.

The velocity adder 115 operates in substantially the same manner as the position error adder 49. If the C4 carry output of the most significant four bit adder 247 is at a logic one value at the occurrence of a high CE carry enable signal on line 101, then both inputs to the NAND gate 269 are high and its output will become low. The low output from the NAND gate 269 is inverted by the NAND gate 271 and seen as a high signal by the J input of the JK flip-flop 141. On the next 10MHZ clock pulse the JK flip-flop 141 is placed in a set state with a high CARRY B signal provided at its Q output, while a low CARRY B/ signal is provided at its $\overline{Q}$ output. The CARRY B/ signal will always be in a logic state opposite the logic state of the CARRY B signal. As mentioned previously, the CARRY B/ signal is employed to fill the least significant bits of the $B_n$ velocity code as it is shifted upward to more significant bits. Therefore, depending on the sign of the velocity, the remaining least significant bits of the $B_n$ velocity code will be filled by all ones or zeros. More precisely, if the sign of the velocity is represented by a binary one CARRY B signal then the remaining least significant bits of the shifted $B_n$ velocity code will be filled by binary zero CARRY B/ signals. Conversely, if the sign of the velocity is represented by a binary zero CARRY B signal, then the remaining least significant bits of the shifted $B_n$ velocity code will be replaced by binary one CARRY B/ signals.

Figure 17:
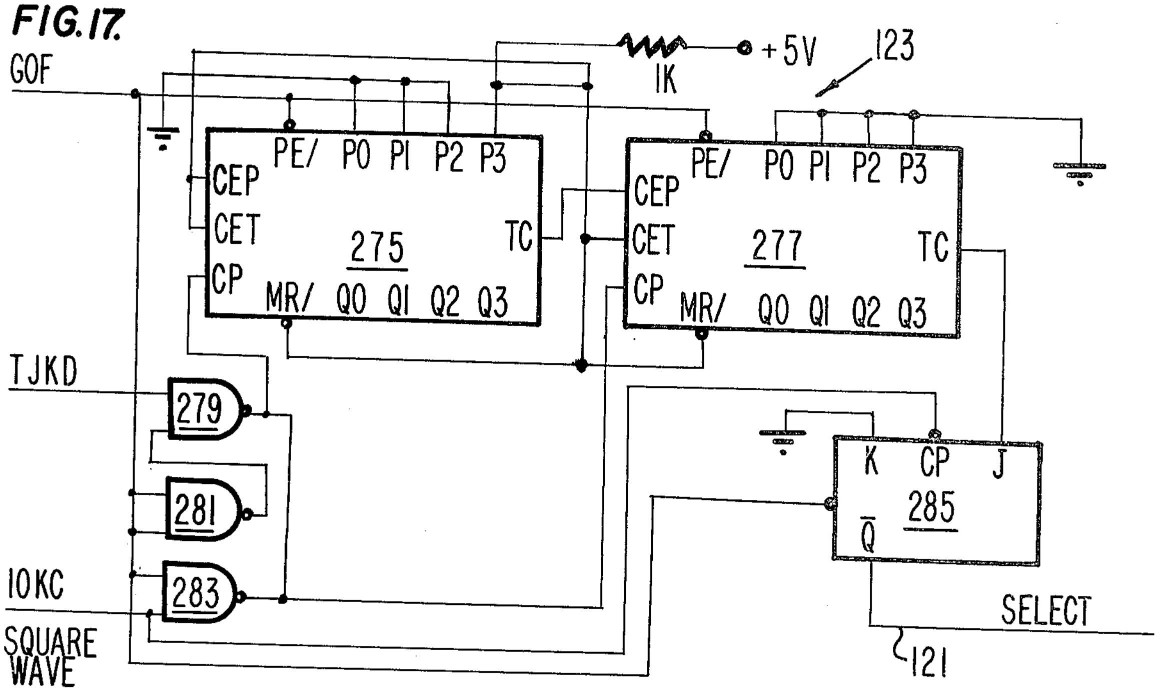
FIG. 17 is a detailed logic diagram of the damping select timer logic of FIG. 3.

The damping select timer generally referred to as 123 in FIG. 17 comprises a pair of four bit binary counters 275 and 277. The PO through P2 parallel inputs to the four bit binary counter 275 are grounded and therefore at a binary zero preset value. The P3 preset input to the binary counter 275 is coupled to +5 volts through a 1K resistor and therefore maintained at a binary one preset value. The PO through P3 parallel inputs to the four bit binary counter 277 are all grounded and therefore at a binary zero preset value. Thus, at the next high clock received at the CP clock input while a low GOF go flip-flop signal is received at their PE/ parallel enable inputs, the four bit binary counters 275 and 277 are preset to a binary eight value. The GOF go flip-flop signal indicates the absence of a print cycle.

After being enabled by a low GOF go flip-flop signal, the four bit binary counters 275 and 277 are loaded with their preset values at the occurrence of a positive going pulse at their CP clock pulse inputs. A NAND gate 279 receives on one of its two inputs a six microsecond TJKD clock signal. The NAND gate 279 receives on its other input the GOF go flip-flop signal after it has been inverted by a NAND gate 281. Thus, when the GOF go flip-flop signal is low, while the TJKD six microsecond clock signal is high, both inputs to the NAND gate 279 are high and its output is low. Then, at the negative going edge of the TJKD clock pulse a positive going pulse is seen at the output of the NAND gate 279 and therefore also at the CP input to the four bit binary counter 275 from the output of the NAND gate 279. Since the PE/ parallel enable input to the four bit binary counter 275 is activated at this time by a low GOF go flip-flop signal, the preset values on the PO–P3 parallel inputs are loaded into the binary counters 275 and 277.

Both the CEP count enable parallel input and CET count enable trickle input of the binary counter 275 is coupled to a +5 volt potential through a 1K resistor in order that it is not inhibited from counting. When the GOF go flip-flop signal goes high, indicating the beginning of a print cycle, the NAND gate 281 outputs a low signal to the input of the NAND gate 279 thereby causing the NAND gate 279 output to remain in high until the next low GOF go flip-flop signal. This high GOF go flip-flop signal is also provided as one input to the NAND gate 283. The output of the NAND gate 283 will therefore be at the opposite logic level of the 10KC square wave on its other input. The four bit binary counter 275 will thus be incremented in accordance with the 10KC square wave input to the NAND gates 283. The four bit binary counter 277 commences counting the 10KC square wave pulses from the output of the NAND gate 283 after its CEP count enable parallel input receives a positive pulse from the TC terminal count of the four bit binary counter 275. In the preferred embodiment of the invention, the print cycles are uniform and equivalent to approximately 33 milliseconds each. Thus, by selecting an appropriate fixed preset value for the four bit binary counters 275 and 277, a terminal count at counter 277 may be achieved at almost any desired point in time in the print cycle.

A JK flip-flop 285 (FIG. 17) has its J input coupled to the TC terminal count output of the four bit binary counter 277. Therefore, once both binary counters 275 and 277 are full, a high terminal count output pulse is provided at the TC terminal count output of the four bit binary counter 277 and is seen at the J input of the JK flip-flop 285. Thus, the JK flip-flop 285 is set on the next low pulse from the 10KC square wave seen at its CP clock pulse input and a low output, designated as the SELECT signal, is provided on its $\overline{Q}$ output.

In the preferred embodiment of the invention, with a binary eight preset value loaded into the counters 275 and 277, a low SELECT signal is produced after approximately 25 milliseconds have elapsed in the print cycle. This low SELECT signal results in a second group of bits being output from the multiplexer 117.

Figure 18:
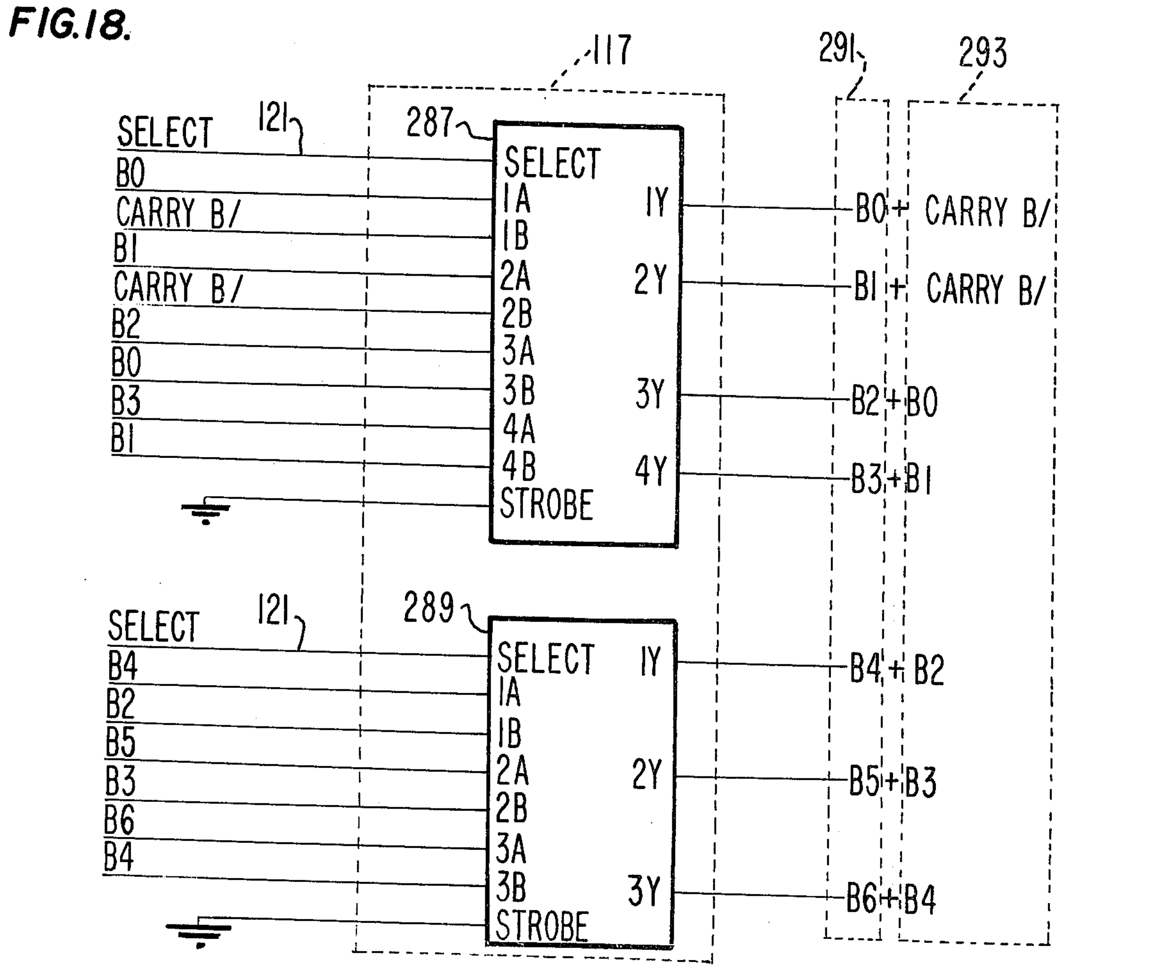
FIG. 18 is a detailed logic diagram of the multiplexer of FIG. 3.

Referring to FIG. 18, it can be seen that the multiplexer 117 comprises a pair of quadruple 2-line to 1-line data selectors/multiplexers 287 and 289. These may be conventional SN 74157 quad 2-1 line data selector/multiplexer integrated circuits. The multiplexers 287 and 289 receive the $B_n$ velocity code from the velocity adder 115 in order that they may adjust the weighting of the velocity at a selected point in the print cycle, as previously mentioned. The B0, B1, B2, B3 bits from the adder 243 (FIG. 16) are received on the 1A through 4A inputs of the multiplexer 287, respectively. The B4, B5 and B6 bits from the adder 245 are received on the 1A through 3A inputs of the multiplexer 289, respectively. These bits form the weighted velocity code output from the 1Y through 4Y outputs of the multiplexer 287 and the 1Y through 3Y outputs of the multiplexer 289, and generally referred to as 291 in FIG. 18, when a low SELECT signal is seen on line 121. When the input to the SELECT inputs of the multiplexers 287 and 289 via 121 is high, the code generally referred to as 293 is provided on the Y multiplexer outputs as selected from the B inputs of the multiplexers 287 and 289. Therefore, until the damping select timer 123 (FIGS. 3 and 17) times out, the SELECT signal on line 121 remains high and the CARRY B/, CARRY B/, B0, B1, B2, B3, and B4 bits are provided on the Y outputs of the multiplexers 287 and 289. It can be seen that this code 293 is two digits less significant than the code 291. It will therefore change more dramatically than code 291 for any given velocity.

In solving the system servo equation, as will be explained in conjunction with the description of the magnitude comparator 149, the rotate velocity is heavily damped when the multiplexer 117 outputs the code 293. With the code 293 provided to the magnitude comparator 149, the velocity is effectively multiplied by a factor of 64 by an upward shift of six bits. When the SELECT signal on line 121 goes low and the code 291 is selected, the weighting is reduced to a factor of times 16 in that the $B_n$ code is only shifted upward by four digits. Thus, when the code 291 is selected as the output of the multiplexer 117, less damping is provided on the rotate motor which may therefore be accelerated for brief instances before the destined rotate position is attained.

Figure 19:
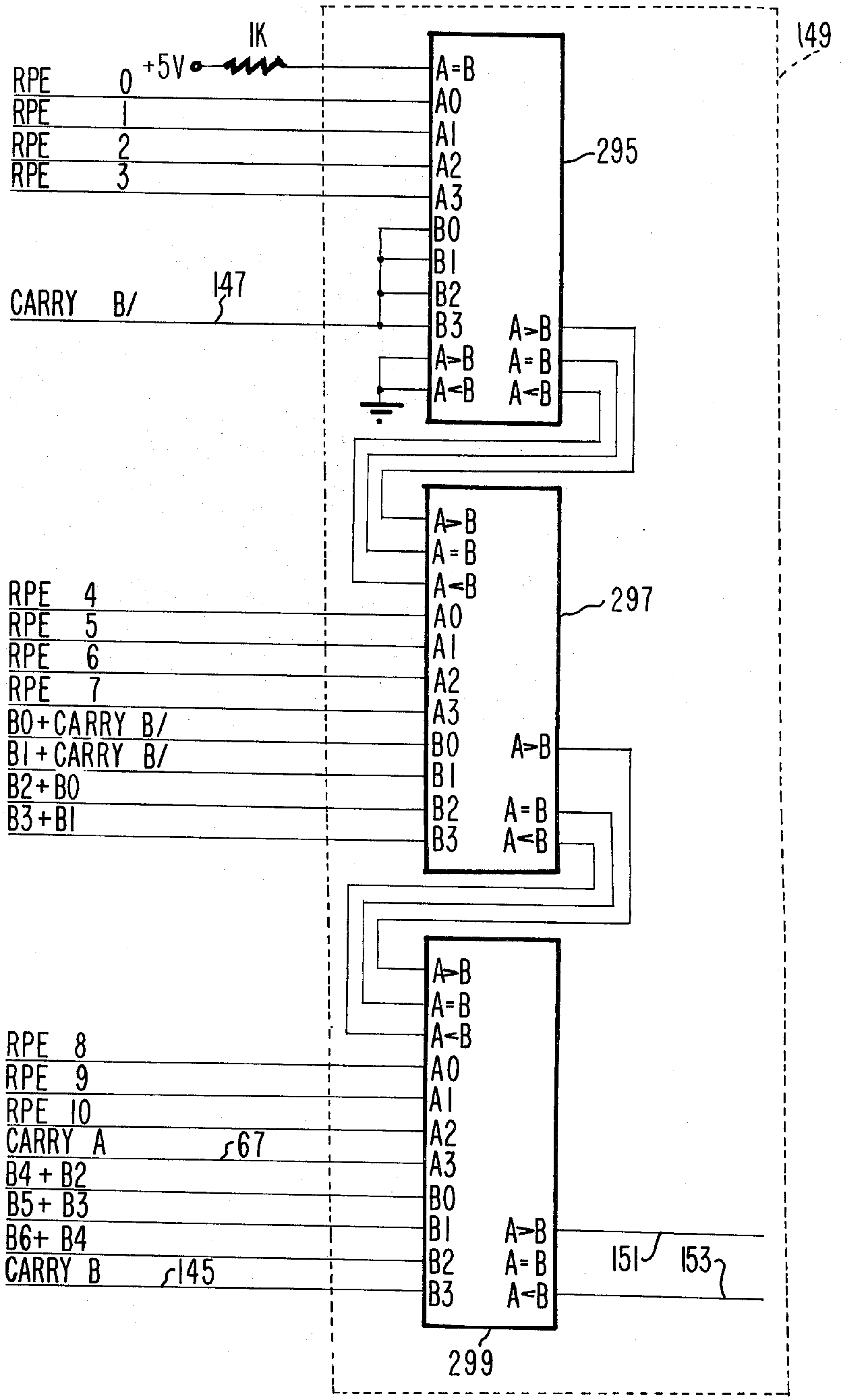
FIG. 19 is a detailed logic diagram of the magnitude comparator of FIG. 4.

The configuration of the magnitude comparator 149 is illustrated in FIG. 19. It can be seen that the magnitude comparator 149 comprises three four bit magnitude comparators 295, 297 and 299. These may be conventional SN 7485 four bit magnitude comparators.

The four bit magnitude comparator 295 receives the RPEO through RPE3 bits of the $RPE_n$ rotate position error code on its A0 through A3 inputs, respectively. The RPEO bit is the least significant bit of the rotate position error code. The BO through B3 inputs to this least significant four bit magnitude comparator 295 receives the CARRY B/ signal on line 147 from the JK flip-flop 273 (FIG. 16). This CARRY B/ signal on line 147 is employed to fill up the least significant bits of the $B_n$ velocity code which is weighted or shifted upward by at least four bits. Depending on the direction of the velocity, as previously explained, this CARRY B/ signal on line 147 will either be a one or a zero.

The four bit magnitude comparator 297 receives on its A0 through A3 inputs, respectively, the RPE4 through RPE7 portion of the $RPE_n$ rotate position error code. These bits are compared with the bits received at the BO through B3 inputs of this four bit magnitude comparator 297 from the multiplexer 287 (FIG. 18). As previously mentioned, the B/, B1, B0 and B1 bits are output from the multiplexer 287 for a predetermined portion of the print cycle. For the remaining portion of the print cycle the B0 through B3 bits from the multiplexer 287 will be seen at the BO through B3 inputs of the four bit magnitude comparator 297.

The four bit magnitude comparator 299 (FIG. 19) receives on its A0 through A2 inputs the RPE8 through RPE10 bits, respectively. of the $RPE_n$ rotate position error code. The B2 through B4 bits from the multiplexer 289 are seen at the B0 through B2 inputs to the four bit magnitude comparator 299 for the predetermined portion of the print cycle. For the remaining portion of the print cycle, the B4 through B6 bits from the multiplexer 289 are seen at the B0 through B2 inputs to the four bit magnitude comparator 299.

The CARRY A signal is received at the A3 input of the four bit magnitude comparator 299 via line 67 for comparison with the CARRY B signal received at the B3 input of the comparator 299 received via line 145. This is the most significant bit of the magnitude comparator 149. As long as the position error and velocity are in the same direction, the CARRY A and CARRY B signal will be at the same binary value and therefore will not affect the output of the output of the magnitude comparator 299. However, in the rare instance that the print head would overshoot its destined rotate position, the sign of the velocity and the sign of the position error would be opposite. For example, if the print head is traveling toward the right as viewed in FIG. 7, the CARRY B signal representing the sign of the velocity, will be a binary zero. The CARRY A signal, representing the sign of the position error, will change from a binary zero to a binary one if the print head overshoots the destined print head character column. Since the CARRY A and CARRY B signals are compared at the most significant bit, the output of the magnitude comparator would then necessarily be that the binary value of the A inputs are greater than the binary value of the B inputs. The resulting output on line 151 of the magnitude comparator would then cause the print head to reverse direction back toward the destined print head character column. When the print head reverses direction, the CARRY B signal would reverse from a binary zero to a binary one, while the CARRY A signal remained a binary one. Since the CARRY A and CARRY B signal would then be at the same binary value, the system would operate to bring the print head to its destined position just the same as it would if the destined print head character column had initially been to the left of the present print head rotate position as seen in FIG. 7. The digital logic and control system would operate in a similar fashion if the print head should happen to overshoot the destined character column as it is traveling from right to left as viewed in FIG. 7. Thus it is seen that the magnitude comparator 149 functions such that if the absolute value of its A inputs is greater than the absolute value of its B inputs, then a positive output signal is seen on the magnitude comparator on line 151. Conversely, if the absolute value of the A inputs is less than the absolute value of the B inputs, then a positive output signal from the magnitude comparator 149 is provided on output line 153, and no output signal is seen on line 151. If the absolute value of the A inputs is equal to the absolute value of the B inputs, then there is an absence of a positive output signal on both lines 151 and 153. The magnitude comparator output lines 151 and 153 are fed to an output buffer 155 (FIG. 4 and FIG. 20).

Figure 20:
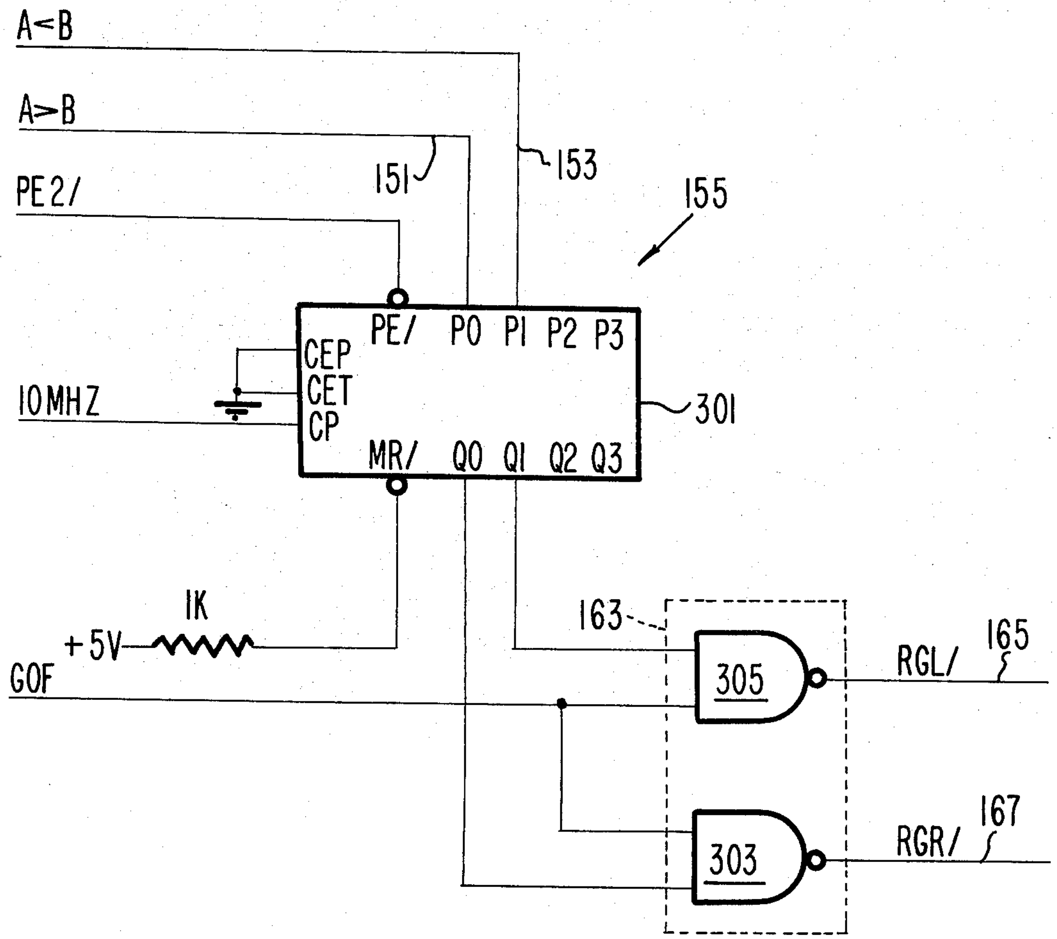
FIG. 20 is a detailed logic diagram of the output buffer and output enable gating logic of FIG. 4.

The output buffer generally referred to as 155 in FIG. 20 may comprise a four bit binary counter 301 having its CEP count enable parallel and CET count enable trickle inputs grounded. The four bit binary counter 301 therefore is employed as a two bit latch and receives at its PO and P1 parallel inputs the output signals from the magnitude comparator output lines 151 and 153. As explained previously, there may be an output on one or the other of the magnitude comparator output lines 151 and 153 but not on both. The magnitude comparator output is thus loaded into the four bit binary counter 301 at either its PO or P1 parallel inputs at a 10MHZ clock pulse succeeding a low PE2/ timing signal received at the PE/ parallel enable input. Since the magnitude comparator operates on a continuous basis, output signals will be occurring on lines 151 and 153 representative of the direction of the drive current to the rotate motor required, irrespective of whether or not the printer is in a print cycle. In order to conserve energy and only drive the rotate motor during an actual print cycle, the output of the output buffer is gated through output enable gating 163 (FIG. 4 and FIG. 20) before being inputted to the predriver 169.

The output enable gating 163 (FIG. 20) comprises a pair of NAND gates 303 and 305 which each receives on one of their inputs the GOF go flip-flop signal indicative of the beginning of a print cycle. The NAND gate 303 receives at its other input the Q0 output from the latch 301. The NAND gate 305 receives as its other input the Q0 output from the latch 301. Therefore, if the Q0 output of the four bit binary counter 301 is high, a low RGR/ rotate go right signal is generated only during a print cycle which is indicated by a high GOF go flip-flop signal at its other input. Similarly, a high signal at the Q1 output of the four bit binary counter 301 is only gated through the NAND gate 305 as a low RGL/ rotate go left signal only during a print cycle.

Figure 21:
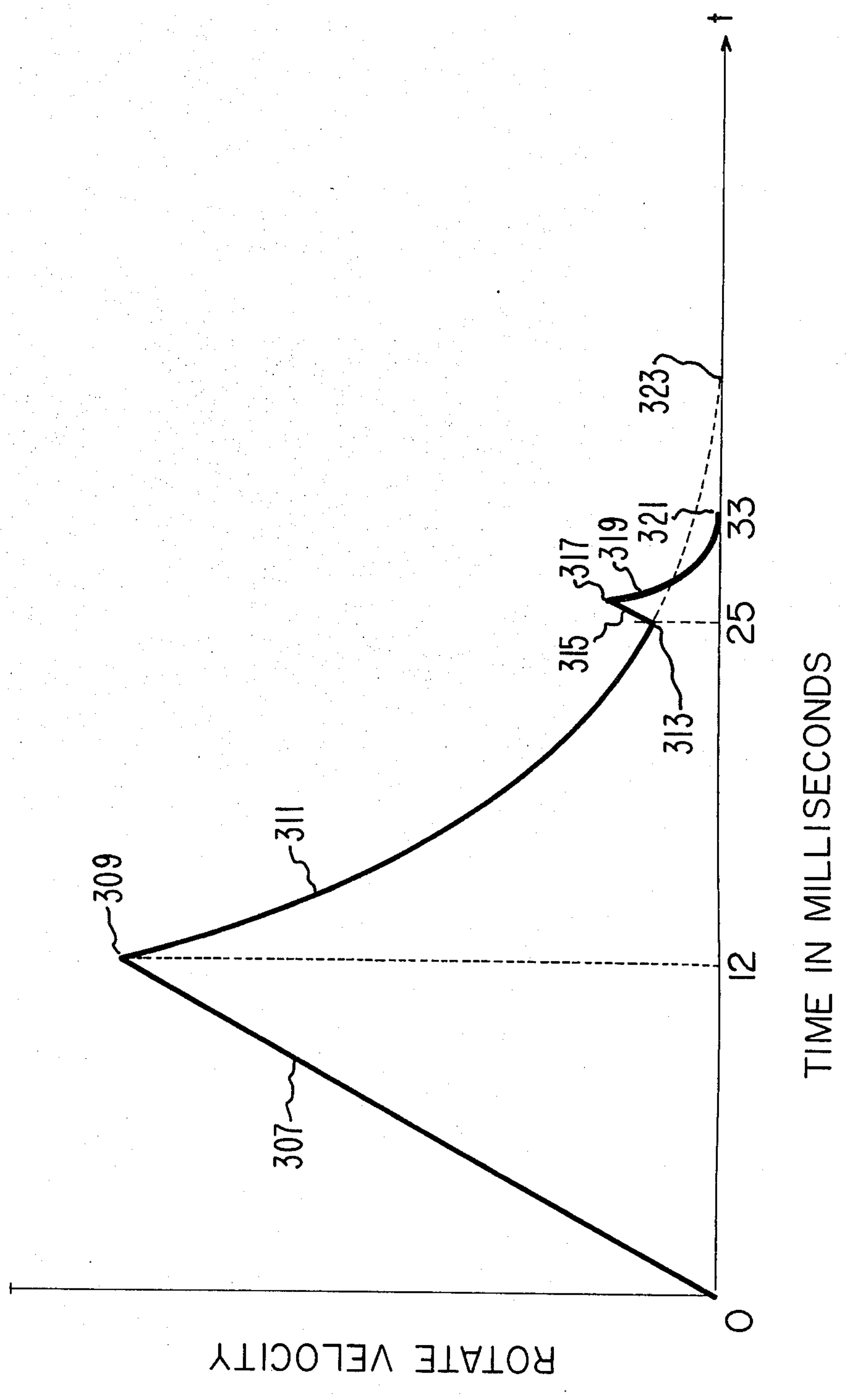
FIG. 21 is a graphic illustration of an optimized velocity profile for a given print cycle of the present invention.

Turning now to FIG. 21, a velocity profile is illustrated for a given 33 millisecond print cycle. The velocity profile in FIG. 21 generally illustrates the rotate velocity vs. time in milliseconds for the print cycle in which the rotate motor travels from one extreme rotate position to the other. This velocity profile, while not drawn to an exact scale, provides a graphic illustration that aids in conceptualizing the solution of the servo equation by the magnitude comparator 149 (FIG. 4 and FIG. 19). The servo equation employed in the preferred embodiment of the present invention is simply that the rotate position error minus a constant times velocity equals zero.

Let us assume that the desired rotate position is such that the rotate motor must be driven in a right direction. Actually, this corresponds to the desired print head character column being to the left of the present print head position as viewed in FIG. 7. With this assumption the $RPE_n$ rotate position error code on the A magnitude comparator inputs will be a large binary value as compared with the $B_n$ weighted velocity code at its B inputs, at the beginning of the print cycle. This results in a A>B signal on line 151, which is gated through the output enable gating 163 as a RGR/ rotate go right signal. This RGR/ signal results in a constant rotate motor drive current in the right direction which is received via line 177 (FIG. 4) by the rotate motor as a RMDR1/ signal. After each count window which is every 100 microseconds the $RPE_n$ rotate position error code is compared with the $B_n$ weighted velocity code. As long as the absolute binary value on the A magnitude comparator inputs is greater than the absolute binary value on the B magnitude comparator inputs, this constant drive current RMDR1/ continuously torques the rotate motor in the right direction. Thus, for a certain initial portion 307 (FIG. 21) the rotate velocity increases at a linear rate due to the constant acceleration of the rotate motor resulting from this constant current drive. While the rotate motor is rotating in this drive right direction, the absolute value of the position error becomes smaller while the absolute value of the weighted velocity increases. After approximately 12 milliseconds in the print cycle illustrated in FIG. 21 the absolute value of the $RPE_n$ rotate position error code and the $B_n$ weighted velocity code become equal. This corresponds to the peak 309 in the velocity profile shown in FIG. 21. It will be remembered that the rotate velocity code is initially multiplied by the factor of 64 by shifting it up six bits as it is presented to the magnitude comparator 149.

Due to this heavy damping the rotate velocity begins to diminish exponentially as illustrated in the portion 311 of the rotate velocity profile (FIG. 21). During this portion 311 of the print cycle the RMDL1/ constant current in the drive left direction dynamically brakes the rotor motor as it continues travelling in the drive right direction and the output of the magnitude comparator alternates between lines 153 and 151 as it attempts to fit the velocity profile to the system servo equation. This heavy damping of the rotate velocity continues until approximately 25 milliseconds have elapsed in the print cycle corresponding to point 313 in FIG. 21. At this point 313 the heavy damping of the velocity is alleviated by the multiplexer 117 selecting the more significant $B_n$ velocity code 291 in response to the timing out of the damping select timer 123. It will be remembered that the rotate velocity code is thus only multiplied by a factor of 16 as it is shifted up four bits as it is presented to the magnitude comparator 149. Then, for a small number of count windows corresponding to the brief portion 315 in FIG. 21, the $RPE_n$ rotate position error code will consistently have an absolute binary value greater than the selected $B_n$ weighted velocity code 291. Thus it is seen that the rotate velocity will linearly increase for a small portion 315 of the velocity profile. The position error and selected weighted velocity codes will quickly equal each other at peak 317. Thereafter, the velocity will decrease exponentially for the remaining portion 319 of the velocity profile. It should be noted that since the damping has been reduced for this remaining portion 319, that the destined rotate position is reached at point 321 corresponding to approximately the end of the 33 millisecond print cycle. If a lighter damping had not been selected at point 313, then the destined rotate position would not have been reached until point 323. Thus, the destined rotate position is reached in a reduced time and yet without any overshoot.

Figure 22:
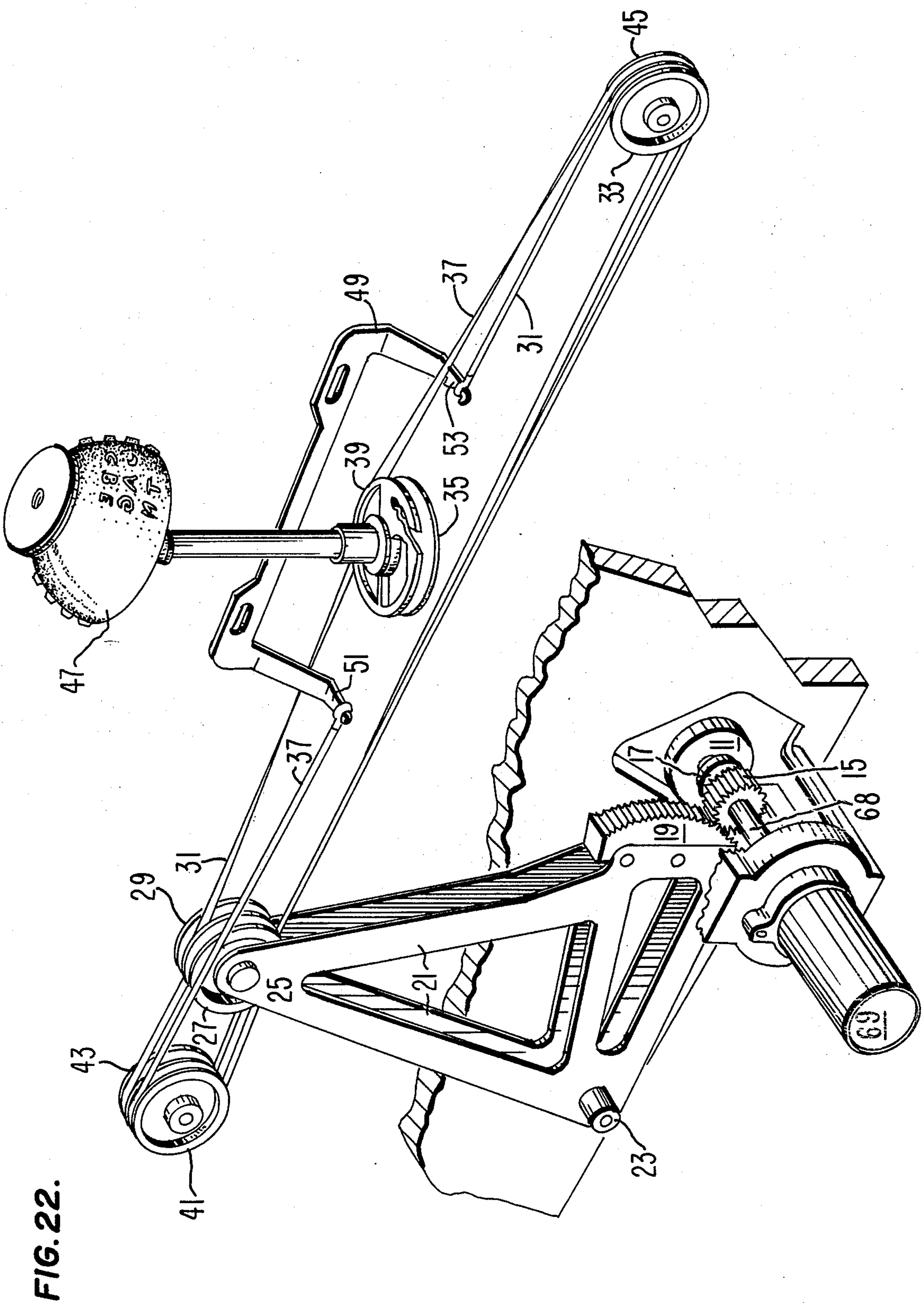
FIG. 22 is a perspective view of a drive mechanism employed to couple the output shaft of a rotate motor with both a resolver and a single element print head whose rotational positioning is controlled by the digital logic and control system of the present invention.

Referring to FIG. 22, a drive mechanism such as a mechanical linkage and pulley system may be employed to rotate the print head to a destined position. A gear 15 mounted on the output shaft 17 of the rotate servo motor 11 cooperates with sector arm gear 19 secured to a sector arm 21 which is rotated about its pivot rod 23 as the rotate servo motor is driven in either a clockwise or counterclockwise direction as viewed in FIG. 22. Depending on the direction that the rotate motor output shaft 17 rotates, the sector arm 21 will either be geared upward or downward, resulting in moving a pair of pulleys 27 and 29, rotatably mounted on the apex of the sector arm 21, either left or right as viewed in FIG. 22. A rotate band 31 which has one end secured to a tab 53 on a fixed bracket 49 is routed around an idler pulley 33, the movable pulley 29, and finally wound about a lower spool 35. A complementary band 37 is routed from a tab 51 on the fixed bracket 49, about an idler pulley 41, the movable pulley 27, idler pulleys 43 and 45, and finally wound onto an upper spool 39. When pulleys 27 and 29 are moved to the right, the rotate band 31 winds around lower spool 35. Simultaneously, the complementary band 37 is unwound from upper spool 39. Thus, the print head 47 is rotated in a clockwise direction as viewed in FIG. 22.

Conversely, when the servo rotate motor 11 causes the sector arm pulleys 27 and 29 to move to the left, the print head 47 is rotated in a counterclockwise direction upon the unwinding of the rotate band 31 from the lower spool 35 while simultaneously winding the complementary band 37 onto the upper spool 39. As mentioned previously, the output shaft 17 of the rotate motor 11 is directly coupled to the input shaft of the resolver 69. The resolver input shaft 68 therefore rotates in a one to one correspondence with the output shaft 17 of the rotate motor 11.

While the digital logic and servo system for print head rotate control has been described in considerable detail, it is understood that various changes and modifications may occur to persons of ordinary skill in the art without departing from the spirit and scope of the invention as defined in the appended claims.

What is claimed is:

1. A digital logic and servo system for controlled rotation of a servo motor to a desired rotate position, said servo motor being driven by a motor control circuit in response to a first logical indication of drive current direction, and said servo motor being dynamically braked by said motor control circuit in response to a second logical indication of drive current direction, said logic and servo system comprising:
- means for receiving an input code representative of said desired rotate position;
- means for detecting the present rotate position of said servo motor;
- means responsive to said detecting means for generating a present rotate position code;
- means responsive to said present rotate position code generating means for deriving a rotate velocity code from said generated rotate position code;
- means responsive to both said receiving means and said generating means for computing a rotate position error code; and
- means for comparing said derived rotate velocity code and said computed rotate position error code to provide first and second logical indications of drive current direction for precisely conforming the velocity of the rotate motor to an optimized velocity profile.

2. The digital logic and servo system of claim 1 further comprising:
- means cooperating with said deriving means and said comparing means for weighting said derived rotate velocity code.

3. The digital logic and servo system of claim 2 further comprising means cooperating with said weighting means for selectively changing the weighting of said derived rotate velocity code.

4. In a serial printer having a single element print head with a plurality of print head character columns disposed on the surface thereof, the single element print head rotatable to a desired print head character column in accordance with the rotation of a servo drive operatively coupled with said rotatable single element print head, a system for controlling the direction of said servo drive in conformity with an optimized velocity profile, comprising:
- means for calculating a servo drive position error representative of the distance the print head remains to be rotated to said desired print head character column;
- means responsive to said position error calculating means for deriving a coded representation of servo drive velocity;
- digital logic means responsive to both said position error calculating means and said deriving means for comparing said calculated servo drive position error and said derived coded representation of servo drive velocity; and
- means responsive to said digital logic comparing means for conforming said servo drive to said optimized velocity profile.

5. The system of claim 4 wherein said servo drive position error calculating means comprises means for generating a binary coded representation of present servo drive position.

6. The system of claim 5 wherein said generating means further comprises means for cyclically regenerating said binary coded representation of present servo drive position.

7. The system of claim 5 wherein said means for generating a binary coded representation of present servo drive rotate position comprises:
- a source of clock pulses;
- means responsive to said source of clock pulses for generating a count window pulse; and
- means responsive to said count window pulse generating means for counting said clock pulse during said generated count window pulse.

8. The system of claim 7 wherein said count window pulse generating means comprises:
- means for detecting the present servo drive rotate position;
- means responsive to said detecting means for generating a phase shifted signal having a phase shift corresponding to said detected present servo drive rotate position.

9. The system of claim 8 wherein said count window pulse generating means further comprises digital logic means responsive to said phase shifted signal generating means and said clock pulses for generating said count window pulse.

10. In a serial printer, a method for controlling the direction of drive current output from a servo motor driver responsive to drive current direction commands for either driving or dynamically braking a servo motor in conformity with a predetermined optimized velocity profile, said servo motor operatively coupled to a single element print head for rotating the single element print head to a desired rotate position, corresponding to a desired print head character column, comprising the steps of:
- receiving a binary coded representation of said desired print head character column;
- detecting the present rotate position of said servo motor;
- generating a binary coded representation of said detected present rotate position;
- calculating the difference between said binary coded representation of the desired print head character column and said generated binary coded representation of the present rotate position;
- deriving a binary coded representation of servo motor rotate velocity from said generated binary coded representation of present rotate position;
- comparing said derived binary coded representation of servo motor rotate velocity with said calculated difference to determine the drive current direction required to conform said servo motor to said optimized velocity profile; and
- commanding said servo motor driver to provide drive current to the servo motor in said determined direction.

* * * * *

UNITED STATES PATENT OFFICE
CERTIFICATE OF CORRECTION

Patent No. 3,924,721 Dated December 9, 1975

Inventor(s) Robert J. Reynolds

It is certified that error appears in the above-identified patent and that said Letters Patent are hereby corrected as shown below:

Col. 2, line 26, change "that the resolver" to read --that once the resolver--.
Col. 7, line 14, change "present invention" to read --present position--.
Col. 7, line 26, change "present invention" to read --present position--.
Col. 7, line 30, change "present invention" to read --present position--.
Col. 7, line 40, change "the top bit" to read --the ten bit--.
Col. 9, line 54, change "output gating" to read --output enable gating--.
Col. 9, line 55, change "during" to --During--.
Col. 11, line 66, change "$RSV_{R}S3$ signals" to --$RSV\overline{R}S3$ signals--.
Col. 13, line 36, change "of the Jk flip flop" to read --of the JK flip flop--.
Col. 15, line 39, change "and its CET" to read --at its CET--.
Col. 20, line 6, change "gates 283" to --gate 283--.
Col. 25, line 42, change "the direction" to --the rotation--.

Signed and Sealed this

*ninth* Day of *March 1976*

[SEAL]

*Attest:*

RUTH C. MASON
*Attesting Officer*

C. MARSHALL DANN
*Commissioner of Patents and Trademarks*